United States Patent
Takada et al.

(10) Patent No.: US 11,675,328 B2
(45) Date of Patent: Jun. 13, 2023

(54) ENCODER, SERVOMOTOR, AND SERVO SYSTEM

(71) Applicant: KABUSHIKI KAISHA YASKAWA DENKI, Kitakyushu (JP)

(72) Inventors: Hiroshi Takada, Kitakyushu (JP); Yasushi Yoshida, Kitakyushu (JP); Yasuhiro Matsutani, Kitakyushu (JP); Daisuke Furukawa, Kitakyushu (JP); Ryo Inoue, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 418 days.

(21) Appl. No.: 17/013,636

(22) Filed: Sep. 6, 2020

(65) Prior Publication Data

US 2021/0072721 A1      Mar. 11, 2021

(30) Foreign Application Priority Data

Sep. 6, 2019    (JP) .............................. JP2019-163024

(51) Int. Cl.
*H02K 15/02* (2006.01)
*G05B 19/23* (2006.01)
(Continued)

(52) U.S. Cl.
CPC ......... *G05B 19/231* (2013.01); *G01D 5/3473* (2013.01); *G01D 5/34707* (2013.01); *H02K 11/22* (2016.01); *G05B 2219/37182* (2013.01)

(58) Field of Classification Search
CPC .................. H02K 11/22; H02K 11/21; G05B 2219/37182
See application file for complete search history.

(56) References Cited

U.S. PATENT DOCUMENTS

2011/0227518 A1    9/2011   Inoue et al.
2011/0303831 A1   12/2011   Nagura
(Continued)

FOREIGN PATENT DOCUMENTS

CN    102200452    9/2011
CN    104613992    5/2015
(Continued)

OTHER PUBLICATIONS

Extended European Search Report for corresponding EP Application No. 20194633.2-1010, dated Feb. 1, 2021.
(Continued)

*Primary Examiner* — Muhammad S Islam
(74) *Attorney, Agent, or Firm* — Mori & Ward, LLP

(57) ABSTRACT

An encoder includes a disc and a sensor. The disc has a circular surface with a central axis and is rotatable around the central axis. The disc has a slit row provided on the circular surface. The slit row includes slits arranged in a circumferential direction of the circular surface around the central axis and in a radial direction of the circular surface. The sensor is provided opposite to the slit row on circular surface. The sensor has a first light receiver and a second light receiver. The first light receiver is configured to output a first light receiving signal as the slit row rotates along the circumferential direction when the disc rotates around the central axis. The second light receiver is configured to output a second light receiving signal as the slit row moves along the radial direction when the disc rotates around the central axis.

22 Claims, 18 Drawing Sheets

(51) Int. Cl.
 *H02K 11/22* (2016.01)
 *G01D 5/347* (2006.01)

(56) References Cited

U.S. PATENT DOCUMENTS

| | | | |
|---|---|---|---|
| 2012/0206024 A1* | 8/2012 | Yoshida | G01D 5/3473 |
| | | | 310/68 B |
| 2015/0123586 A1* | 5/2015 | Yoshida | H02K 11/22 |
| | | | 310/68 B |
| 2019/0207464 A1* | 7/2019 | Takii | F21S 41/675 |
| 2019/0219422 A1 | 7/2019 | Weis et al. | |
| 2021/0010807 A1 | 1/2021 | Holzapfel et al. | |

FOREIGN PATENT DOCUMENTS

| | | |
|---|---|---|
| CN | 110030924 | 7/2019 |
| EP | 2869033 | 5/2015 |
| EP | 2930472 | 10/2015 |
| EP | 3764064 | 1/2021 |
| JP | 2012-168066 | 9/2012 |
| JP | 2015-105829 | 6/2015 |

OTHER PUBLICATIONS

Chinese Office Action for corresponding CN Application No. 202010712300.8, dated Mar. 3, 2022 (w/ English machine translation).

Japanese Office Action for corresponding JP Application No. 2019-163024, dated May 14, 2021 (w/ English machine translation).

Chinese Office Action for corresponding CN Application No. 202010712300.8, dated Nov. 23, 2022 (w/ English machine translation).

* cited by examiner

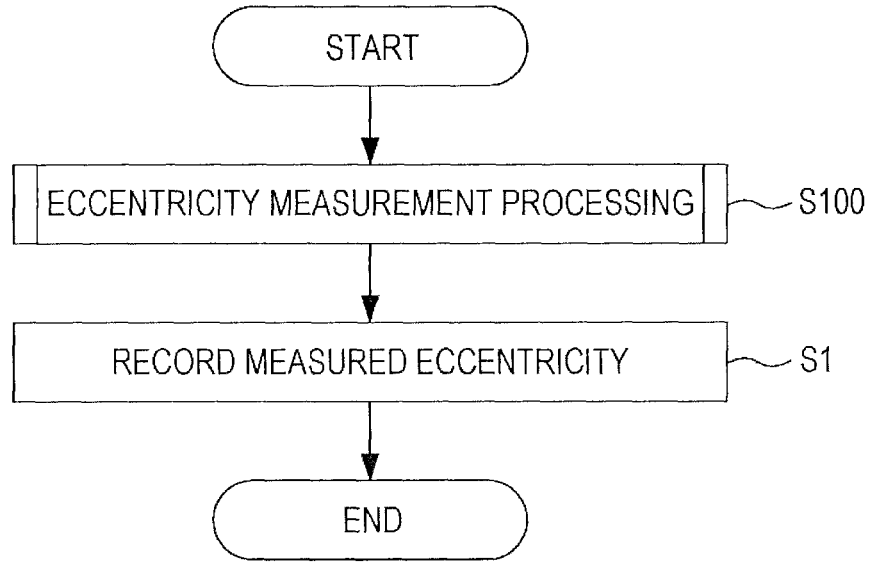
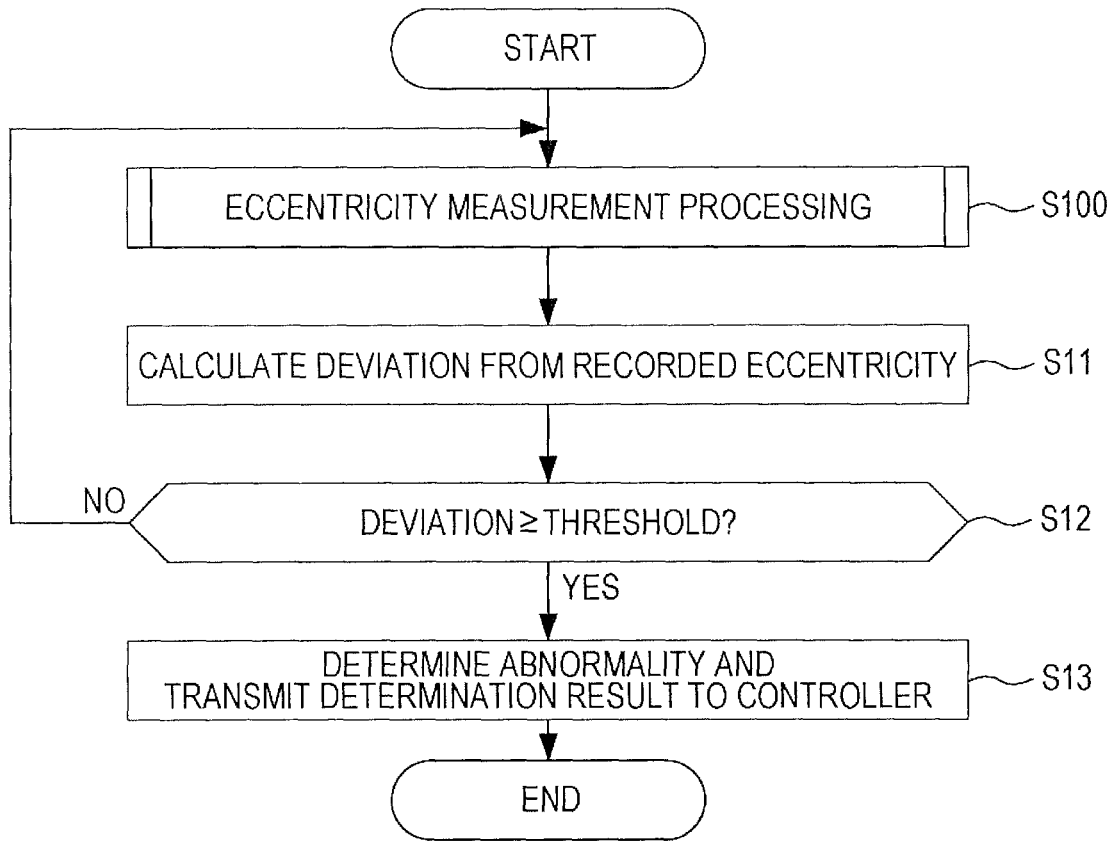

ENCODER, SERVOMOTOR, AND SERVO SYSTEM

CROSS-REFERENCE TO RELATED APPLICATIONS

The present application claims priority under 35 U.S.C. § 119 to Japanese Patent Application No. 2019-163024, filed Sep. 6, 2019. The contents of this application are incorporated herein by reference in their entirety.

BACKGROUND

Technical Field

The disclosure includes an embodiment relating to an encoder, a servomotor, and a servo system.

Discussion of the Background

Japanese Patent Application Laid-Open No. 2012-168066 describes a servomotor manufacturing apparatus including a linear encoder positioned to oppose a concentric circular pattern provided on a rotary disc and configured to measure eccentricity between a rotation axial center of a shaft and a center of the rotary disc.

SUMMARY

According to one aspect of the present invention, an encoder includes a disc and a sensor. The disc has a circular surface with a central axis and is rotatable around the central axis. The disc has a slit row provided on the circular surface. The slit row includes slits arranged in a circumferential direction of the circular surface around the central axis and in a radial direction of the circular surface. The sensor is provided opposite to the slit row on circular surface. The sensor has a first light receiver and a second light receiver. The first light receiver is configured to output a first light receiving signal as the slit row rotates along the circumferential direction when the disc rotates around the central axis. The second light receiver is configured to output a second light receiving signal as the slit row moves along the radial direction when the disc rotates around the central axis.

According to another aspect of the present invention, a servomotor includes a motor and the encoder discussed above. The motor includes a stator and a rotor which is configured to rotate with respect to the stator. The encoder is configured to detect at least one of a position, speed, and acceleration of the rotor.

According to further aspect of the present invention, a servo system includes a motor, the encoder discussed above, and control circuitry. The motor includes a stator and a rotor which is configured to rotate with respect to the stator. The encoder is configured to detect at least one of a position, speed, or acceleration of the rotor. The control circuitry is configured to control the motor in accordance with a result of detection by the encoder.

DESCRIPTION OF DRAWINGS

FIG. 10 is a flowchart depicting an exemplary procedure for eccentricity recording executed by the signal processor.

FIG. 11 is a flowchart depicting an exemplary procedure for eccentricity abnormality determination executed by the signal processor.

DESCRIPTION OF EMBODIMENTS

An embodiment will be described hereinafter with reference to the drawings.

1. Servo System

Figure 1:
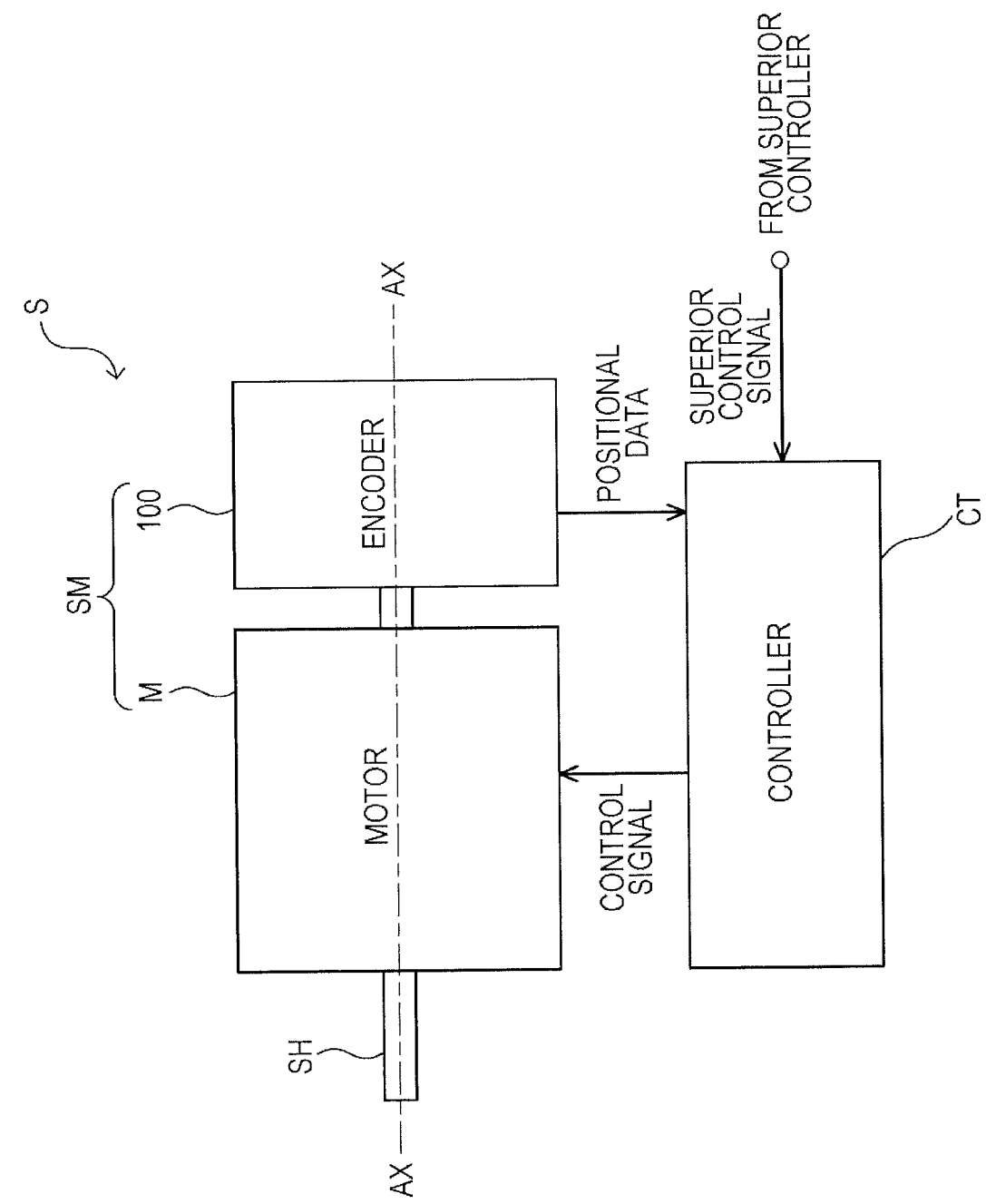
FIG. 1 is an explanatory view depicting an exemplary schematic configuration of a servo system according to an embodiment.

A servo system according to the present embodiment will initially be described in terms of its configuration with reference to FIG. 1. FIG. 1 depicts a servo system S including a servomotor SM and a controller (control circuitry) CT. The servomotor SM includes an encoder 100 and a motor M.

The motor M exemplifies a power source not including the encoder 100. The motor M is of a rotary type including a rotor (not depicted) configured to rotate relatively to a stator (not depicted), and outputs rotary power by rotating a shaft SH fixed to the rotor about a rotation axial center AX.

Although the motor M itself may be called a servomotor in some cases, the servomotor SM according to the present embodiment includes the motor M and the encoder 100. The following description is conveniently made to the servomotor SM controlled to follow a target value relevant to a position, speed, or the like. Examples of the servomotor SM also include a motor that is not applied to a servo system and has only to be provided with an encoder having output used only for display.

The motor M should not be particularly limited as long as the encoder 100 is configured to detect positional data or the like. The motor M should not be limited to an electric type configured as a power source using electricity, and examples of the motor M include a hydraulic motor, an air motor, and a steam motor, which are configured as different power sources. Described below is the motor M of the electric type.

The encoder 100 is coupled to an end opposite to a rotary power output end of the shaft SH of the motor M. The encoder 100 should not necessarily be coupled to the opposite end, and may alternatively be coupled to the rotary power output end of the shaft SH. The encoder 100 detects a position of the shaft SH (rotor) to detect a position (also called a rotation angle) of the motor M, and outputs positional data indicating the position.

The encoder 100 may detect, in addition to or instead of the position of the motor M, at least one of speed (also called rotational speed, angular speed, or the like) of the motor M and acceleration (also called roll acceleration, angular acceleration, or the like) of the motor M. In this case, the speed and the acceleration of the motor M can be detected through processing such as first or second order differentiation between the position and time or predetermined time counting of a detection signal (e.g. an incremental signal to be described later). The following description assumes that the encoder 100 is configured to detect physical quantity exemplified by a position.

The controller CT acquires the positional data outputted from the encoder 100, and controls rotation of the motor M in accordance with the positional data. The controller CT controls rotation of the motor M of the electric type according to the present embodiment, by controlling current, voltage, or the like applied to the motor M in accordance with the positional data. The controller CT can further acquire a superior control signal from a superior controller and control the motor M such that the shaft SH of the motor M outputs rotary power achieving a position or the like indicated by the superior control signal. In the case where the motor M is configured as a different power source such as the hydraulic motor, the air motor, or the steam motor, the controller CT can control rotation of the motor M by controlling supply from the power source.

2. Encoder

Figure 2:
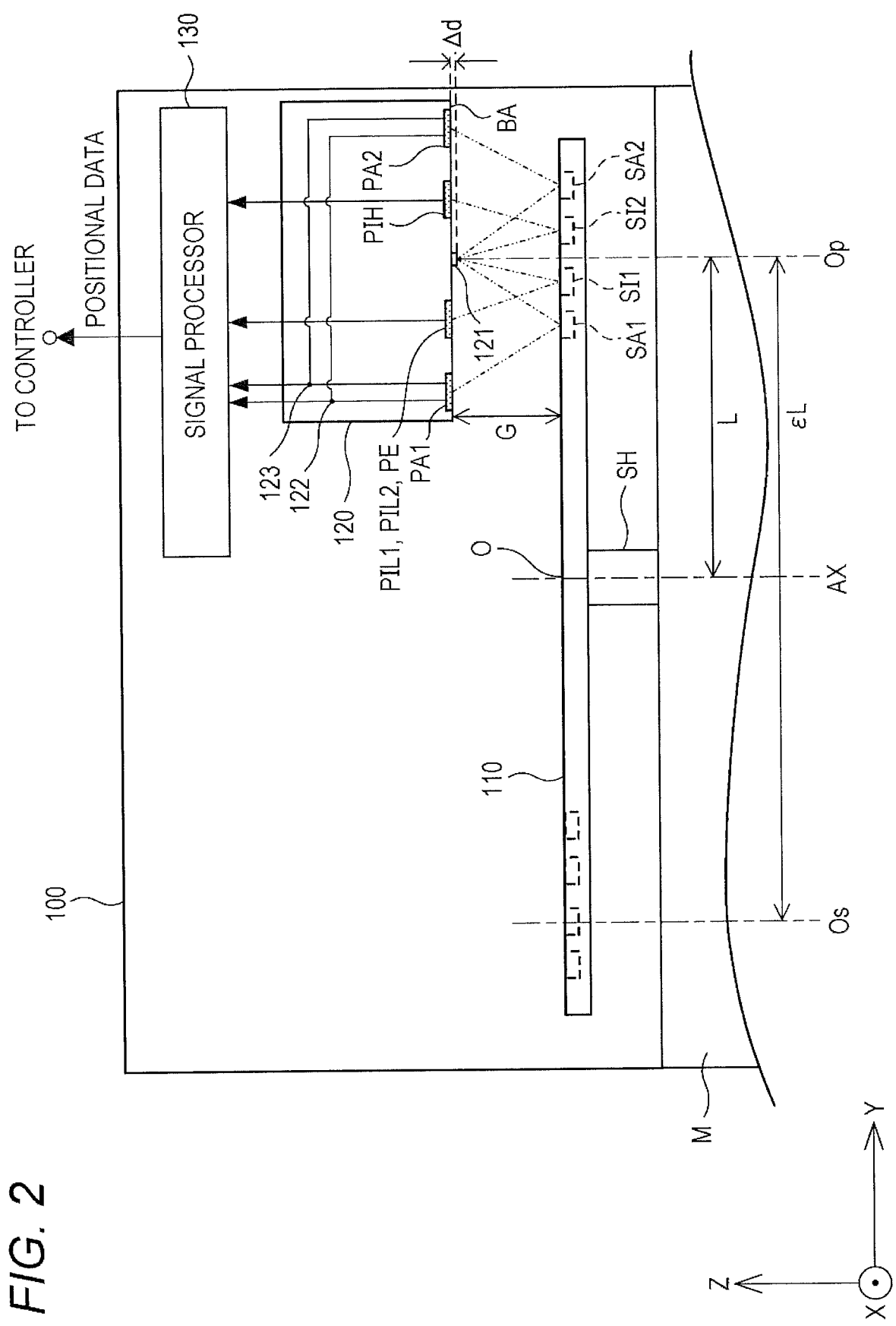
FIG. 2 is an explanatory view depicting an exemplary schematic configuration of an encoder according to the embodiment.

Described next is the encoder 100 according to the present embodiment. As depicted in FIG. 2, the encoder 100 includes a disc 110, an optical module 120, and a signal processor 130.

For convenient description in terms of a structure of the encoder 100, directions including an upward direction and a downward direction will be defined as follows to be referred to where appropriate. FIG. 2 assumes that the disc 110 faces the optical module 120 in an "upward" direction corresponding to a positive direction of a Z axis, and the Z axis has a negative direction corresponding to a "downward" direction. These directions are changed in accordance with how the encoder 100 is installed, and should not limit positional relations among the constituents of the encoder 100.

2-1. Disc

Figure 3:
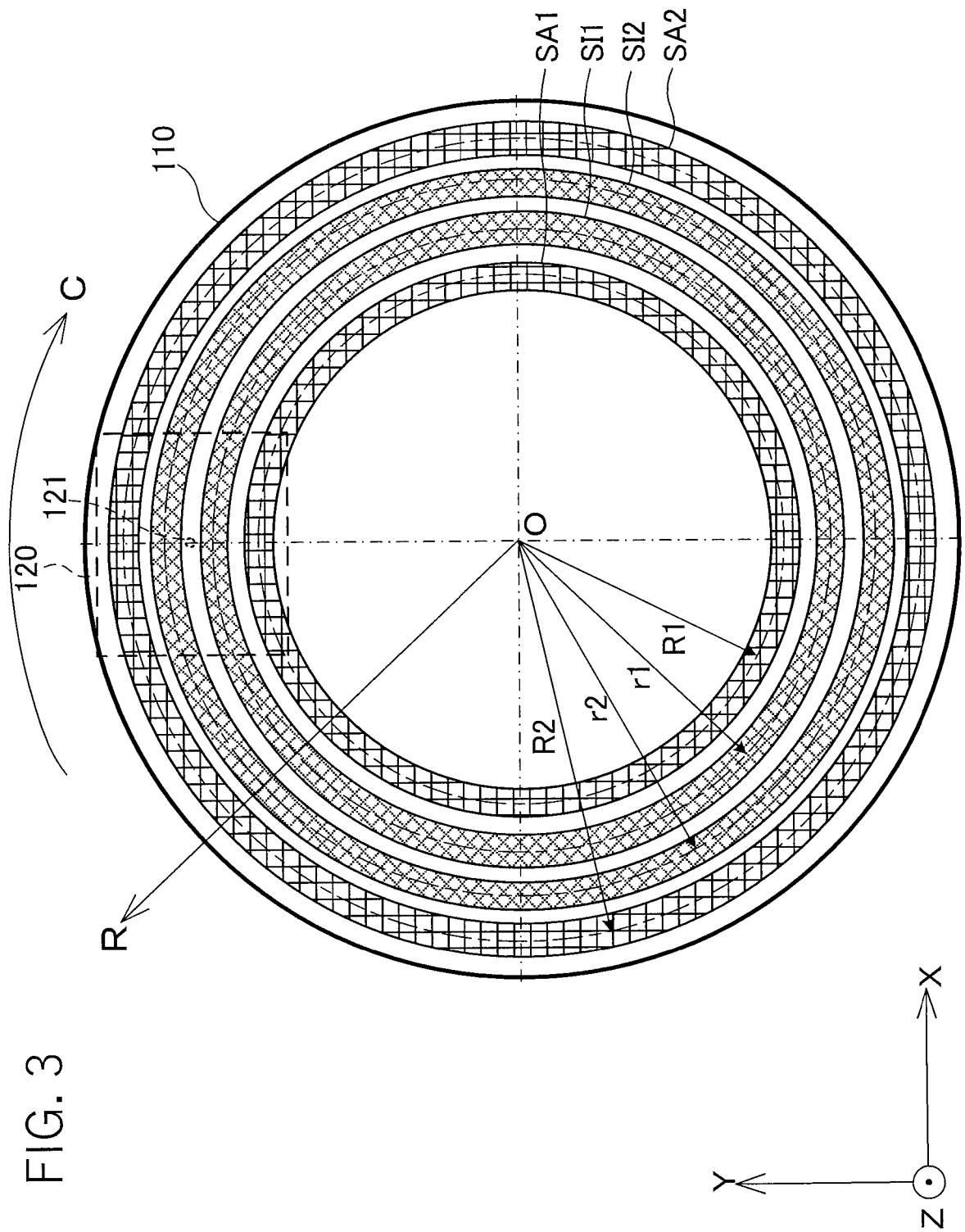
FIG. 3 is a top view depicting an exemplary configuration of a disc.

As depicted in FIG. 3, the disc 110 has a circular plate shape and a disc center O substantially matching the rotation axial center AX. The disc 110 is coupled to the shaft SH of the motor M so as to be rotated in accordance with rotation of the shaft SH. The present embodiment exemplifies, as a measurement target for measurement of rotation of the motor M, the disc 110 having the circular plate shape. Examples of the measurement target can also include any other appropriate portion such as an end surface of the shaft SH. FIG. 2 exemplarily depicts the disc 110 directly coupled to the shaft SH. The disc 110 may alternatively be coupled to the shaft SH via a coupler like a hub.

As depicted in FIG. 3, the disc 110 has a plurality of slit tracks SA1, SI1, SI2, and SA2. The disc 110 rotates when driven by the motor M, whereas the optical module 120 is fixedly positioned so as to oppose part of the disc 110. The slit tracks SA1, SI1, SI2, and SA2 and the optical module 120 thus shift relatively in a direction along a circumference (a direction along arrow C indicated in FIG. 3; hereinafter referred to as a "circumferential direction C" where appropriate) when driven by the motor M. The optical module 120 optically measures the slit tracks provided on the disc 110 in the circumferential direction C.

The slit tracks SA1, SI1, SI2, and SA2 are each provided on a top surface of the disc 110 as a slit row having a ring shape around the disc center O. Each of the "slit rows" referred to in the present application should not limitedly have arrangement including slits aligned in a single direction (the circumferential direction C) as in the slit tracks SA1, SI2, and SA2, and can have matrix arrangement including slits aligned in a plurality of directions (the circumferential direction C and a radial direction R) as in the slit track SI1. The slit tracks each include a plurality of reflection slits (in each part hatched with oblique lines in FIG. 4) aligned in the circumferential direction C (the circumferential direction C and the radial direction R in the slit track SI1) on the entire circumference of the track. Each of the reflection slits reflects light emitted from a light source 121.

The disc 110 is made of a light reflecting material such as metal. The disc 110 is provided, in a part not reflecting light on its surface, by etching, applying, or the like, with a material having a low reflectance (e.g. chromium oxide), so as to have the reflection slits in the remaining part not provided with the material. The part not reflecting light may alternatively be surface roughened by sputtering or the like to have the reflection slits.

The disc 110 should not be particularly limited in terms of the material, a manufacturing method, or the like. For example, the disc 110 can be made of a light transmitting material such as glass or transparent resin. In this case, the disc 110 can be provided, on the surface, with a light reflecting material (e.g. chromium) by vapor deposition or the like, to have the reflection slits.

The "slit" referred to in the present application corresponds to a region that is provided on the disc 110 and has an effect such as reflection (including reflection diffraction)

or transmission (including transmission diffraction) of light emitted from the light source 121. The slits are plurally provided in the circumferential direction C or the like to have a predetermined pattern, so as to constitute each of the slit tracks. The present embodiment exemplifies a case where the slits are constituted as the reflection slits.

Figure 4:
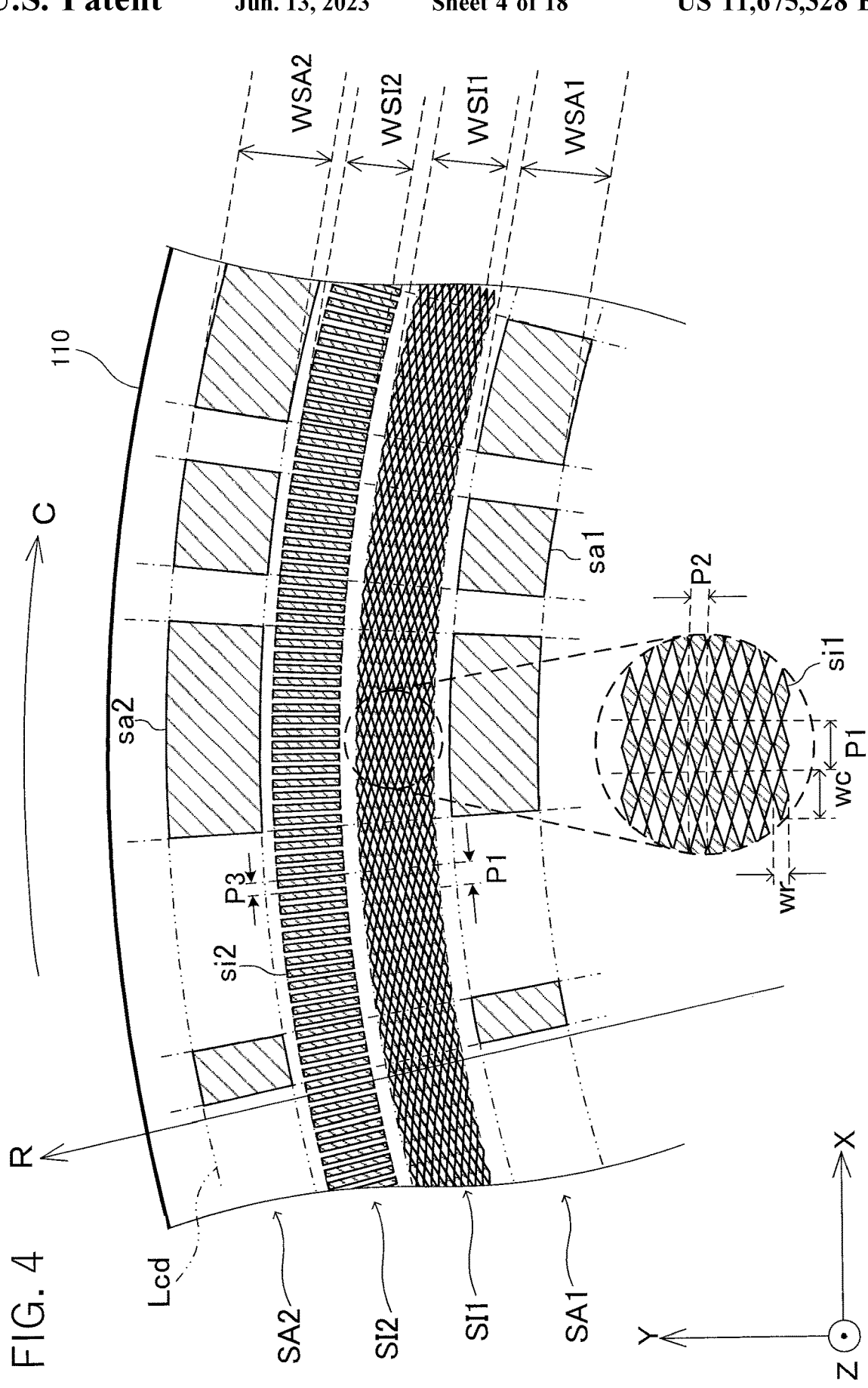
FIG. 4 is an enlarged partial view of a top surface of the disc, depicting exemplary configurations of slit tracks.

There are four slit tracks aligned in a direction along a radius (in a direction along arrow R indicated in FIG. 3; hereinafter referred to as the "radial direction R" where appropriate) on the top surface of the disc 110. The radial direction R is substantially perpendicular to the circumferential direction C, and each of the slit tracks has a length in the radial direction R corresponding to a width of the slit track. The four slit tracks are arranged concentrically and are denoted by reference signs SA1, SI1, SI2, and SA2 in the mentioned order from inside to outside in the radial direction R. FIG. 4 is an enlarged view of a part adjacent to a region, opposing the optical module 120, of the disc 110, for more detailed description of the slit tracks.

As depicted in FIG. 4, the slit track SA1 includes a plurality of reflection slits sa1 and the slit track SA2 includes a plurality of reflection slits sa2. The reflection slits sa1 and the reflection slits sa2 are aligned on the entire circumference of the disc 110 to have absolute patterns (exemplified by a first absolute pattern and a second absolute pattern, respectively) in the circumferential direction C.

The "absolute patterns" are each uniquely determined, during single rotation of the disc 110, in terms of positions, proportion, and the like of the reflection slits provided within an angle opposing a light receiving array included in the optical module 120 to be described later. In the absolute patterns exemplified in FIG. 4, when the motor M is located at a certain angular position, combination of bit patterns defined by detection or undetection of a plurality of light receiving elements included in the opposing light receiving array uniquely indicates an absolute position of the angular position. The "absolute position" indicates an angular position with respect to an origin during single rotation of the disc 110. The origin is set at an appropriate angular position during single rotation of the disc 110, and the absolute patterns are provided with respect to the origin.

The absolute patterns according to the present embodiment enable unidimensional indication of the absolute position of the motor M by means of bits of the number of the light receiving elements in the light receiving array. The absolute patterns are, however, not limited to this example. The absolute patterns may alternatively enable multidimensional indication by means of the bits of the number of the light receiving elements. Examples of the absolute patterns include predetermined bit patterns, as well as various patterns including a pattern changed such that physical quantity like quantity or a phase of light received by each of the light receiving elements uniquely indicates an absolute position, and a pattern obtained by modulating a code sequence of an absolute pattern.

In the present embodiment, similar absolute patterns are provided at an identical position in the circumferential direction C as the two slit tracks SA1 and SA2. The slit track SA1 and the slit track SA2 have identical angular positions at both circumferential ends of the slits (the positions in the circumferential direction C).

The slit track SI1 (exemplifying a slit row, specifically a first incremental slit row) includes a plurality of reflection slits si1 aligned on the entire circumference of the disc 110 so as to have a first repetition pattern (exemplifying a first incremental pattern) in the circumferential direction C and a second repetition pattern in the radial direction R. The first repetition pattern and the second repetition pattern are so-called incremental patterns. As depicted in a partially enlarged view of the slit track SI1 in FIG. 4, the slit track SI1 is provided such that the first repetition pattern has a pitch P1 longer than a pitch P2 of the second repetition pattern. The pitch P1 should not necessarily be longer than the pitch P2, and the pitch P1 may alternatively be equivalent to or shorter than the pitch P2. The slit track SI1 is provided to have the first repetition pattern with the pitch P1 gradually increased toward an outer position in the radial direction.

The reflection slits si1 in the slit track SI1 are shaped to have a radial width wr increased and decreased in the circumferential direction C, and a circumferential width wc increased and decreased in the radial direction R. The reflection slits si1 are shaped to be substantially line symmetric in the circumferential direction with respect to an axis in the radial direction R at a position with the maximum width wr, as well as to be substantially line symmetric in the radial direction with respect to a symmetry axis in the circumferential direction C at a position with the maximum width wc. The shape of being "line symmetric in the radial direction" does not need to be strictly line symmetric, and includes a shape not being line symmetric because of increase and decrease of the pitch due to difference in radial position but becoming line symmetric when pitches are arrayed linearly. Such a line symmetric state herein includes a case where light receiving signal strength is line symmetric in the radial direction except for disregardable difference such as a signal processing error upon radial change in relative position between the slits and the light receiving elements. The reflection slits si1 are each shaped by compressing in the radial direction R a right-angle rotationally symmetric shape that is substantially identically shaped before and after right-angle rotation (e.g. a square shape rotated by 45 degrees), and have a substantially rhomboid shape in the present embodiment.

The slit track SI2 (exemplifying a second incremental slit row) includes a plurality of reflection slits si2 arranged on the entire circumference of the disc 110 so as to have an incremental pattern (exemplifying a second incremental pattern) in the circumferential direction C.

The "incremental pattern" corresponds to a pattern regularly repeated at a predetermined pitch as depicted in FIG. 4. The "pitch" indicates an interval of the reflection slits provided in the slit track SI1 or SI2 having an incremental pattern. As depicted in FIG. 4, the slit track SI1 has the pitch P1 in the circumferential direction and the pitch P2 in the radial direction, whereas the slit track SI2 has a pitch P3 in the circumferential direction. The incremental pattern is different from the absolute patterns indicating the absolute position with detection and undetection by the plurality of light receiving elements as bits, and indicates the position of the motor M for each pitch or in one pitch with a sum of a detection signal from at least one of the light receiving elements. Accordingly, the incremental pattern does not indicate the absolute position of the motor M, but can indicate the position much more accurately than the absolute pattern.

The present embodiment sets the pitch P1 in the circumferential direction of the slit track SI1 to be longer than the pitch P3 in the circumferential direction of the slit track SI2. The pitches are set to satisfy P1=2×P3, for example. Specifically, the number of the reflection slits si2 in the slit track SI2 is twice the number of rows of the reflection slits si1 in the slit track SI1 (the number of circumferential rows assuming the plurality of reflection slits si1 aligned in the radial direction as one row). The pitches of the slits are not limited to this example, and may satisfy any value such as three times, four times, or five times.

The reflection slits sa1 and sa2 in the slit tracks SA1 and SA2 according to the present embodiment have the minimum length in the circumferential direction C equal to the pitch P1 in the circumferential direction of the reflection slits si1 in the slit track SI1. Absolute signals according to the slit tracks SA1 and SA2 have resolution equal to resolution in the circumferential direction C of the slit track SI1 (the number of rows of the reflection slits si1).

2-2. Optical Module

Figure 5:
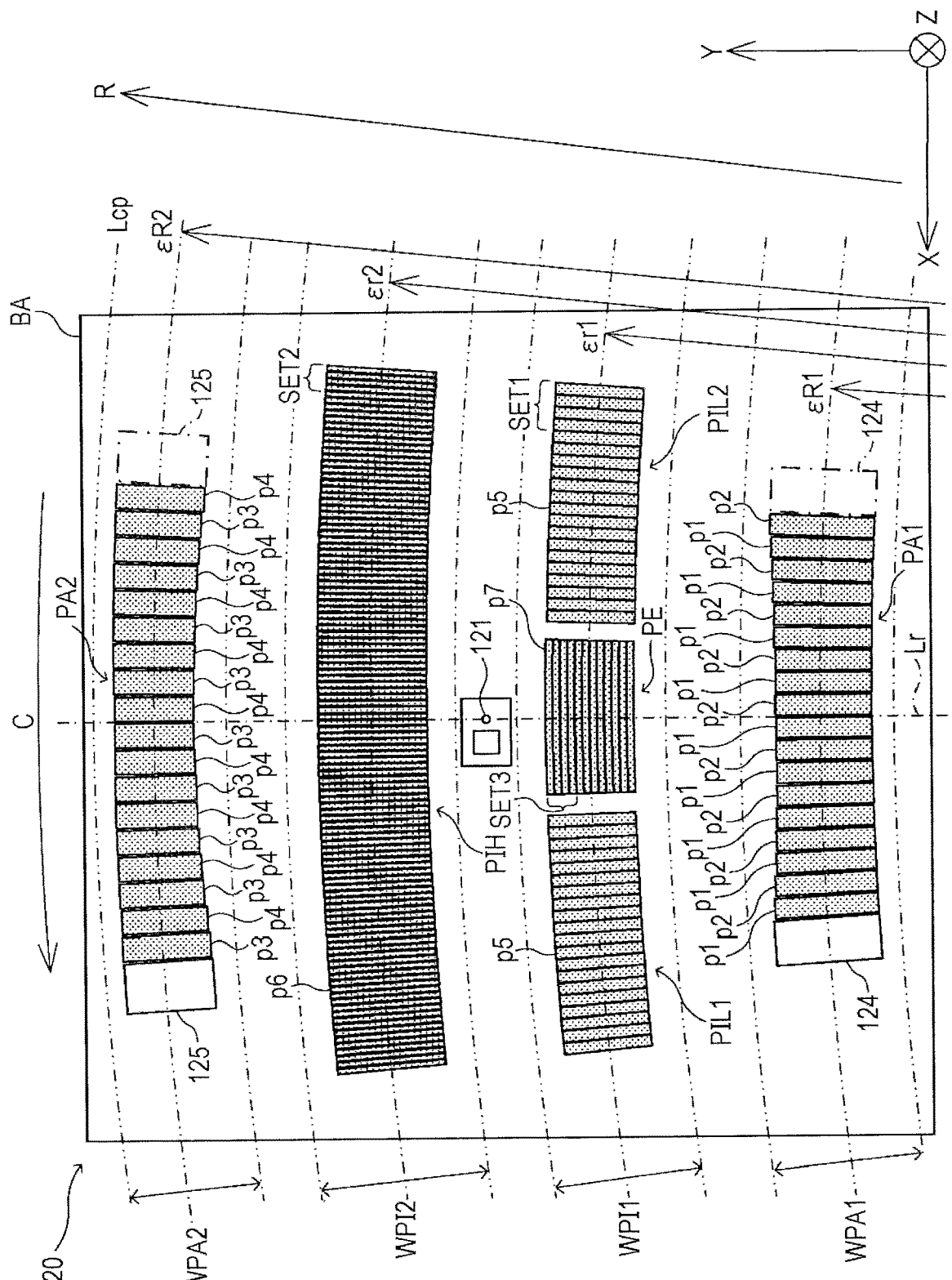
FIG. 5 is a bottom view depicting an exemplary layout configuration of a light source and light receiving arrays included in an optical module.

The optical module 120 exemplifies a sensor unit. As depicted in FIG. 2 and FIG. 5, the optical module 120 is constituted as a substrate BA parallel to the disc 110. The optical module 120 shifts in the circumferential direction C, along with rotation of the disc 110, relatively to the slit tracks SA1, SI1, SI2, and SA2. The optical module 120 should not necessarily be constituted by such a single substrate, and may alternatively be constituted by a plurality of substrates. These substrates may be arranged intensively in this case. The optical module 120 may not shaped as the substrate.

As depicted in FIG. 2 and FIG. 5, the optical module 120 is provided, on a surface of the substrate BA opposing the disc 110, with the light source 121 and a plurality of light receiving arrays PA1, PIL1, PIL2, PE, PIH, and PA2.

As depicted in FIG. 3, the light source 121 is positioned to oppose a portion between the slit track SI1 and the slit track SI2. The light source 121 emits light toward opposite portions of the four slit tracks SA1, SI1, SI2, and SA2 passing positions opposing the optical module 120.

The light source 121 should not be particularly limited if the light source is configured to apply light to an irradiation region, and examples thereof include a light emitting diode (LED). The light source 121 is configured as a point light source not particularly including any optical lens or the like, and emits diffused light from a light emitter. The light source called a "point light source" does not need to be configured strictly, and examples of the point light source include a light source that can be considered, in terms of design or principle of operation, as being configured to emit diffused light from a portion having a substantially point shape even though light is emitted from an emission surface having a limited area. The "diffused light" is not limited to light emitted in every direction from a point light source, and examples thereof include light emitted while being diffused in a limited constant direction. Examples of the "diffused light" accordingly include light having more diffusibility than parallel light. The light source 121 configured as the point light source can apply light substantially equally to the four slit tracks SA1, SI1, SI2, and SA2 passing the opposite positions. The light source 121 does not condense or diffuse light with use of any optical element, and can achieve high light straightness toward the slit tracks with no error or the like caused by the optical element.

Each of the light receiving arrays PA1, PIL1, PIL2, PE, PIH, and PA2 includes a plurality of light receiving elements (portions hatched with dots in FIG. 5) positioned around the light source 121 and configured to receive light reflected by the reflection slits in a corresponding one of the slit tracks. The plurality of light receiving elements is aligned in the circumferential direction C or the radial direction R as depicted in FIG. 5. Each of the light receiving elements can be constituted by a photodiode or the like. The light receiving elements should not be limited to the photodiodes, and are not particularly limited as long as the light receiving elements are each configured to receive light emitted from the light source 121 and convert the light to an electric signal.

The light source 121 is configured to emit diffused light. The optical module 120 is provided thereon with projection images of the slit tracks, which are each enlarged at a predetermined enlargement ratio E according to an optical path length. Assuming that the slit tracks SA1, SI1, SI2, and SA2 have lengths WSA1, WSI1, WSI2, and WSA2 in the radial direction R, respectively, and light reflected at the slit tracks and projected on the optical module 120 has shapes with lengths WPA1, WPI1, WPI2, and WPA2 in the radial direction R, respectively, as depicted in FIG. 4 and FIG. 5, the lengths WPA1, WPI1, WPI2, and WPA2 are longer by a times than the lengths WSA1, WSI1, WSI2, and WSA2. As depicted in FIG. 5, the present embodiment sets such that the light receiving arrays have radial center positions substantially matching radial center positions of the projection images of the slits on the optical module 120, and the projection images of the slits on the optical module 120 have lengths in the radial direction R larger by predetermined amounts than lengths in the radial direction R of the light receiving elements in the light receiving arrays. The predetermined amounts are set to appropriate values such that the light receiving arrays are positioned inside the projection images of the slits even in a case where the disc 110 is eccentric. Such an "eccentric" state in the present embodiment includes both radial shift of the disc 110 relative to the optical module 120 caused by eccentricity between the rotation axial center AX of the shaft SH and the disc center O of the disc 110 due to an error, a tolerance, or the like relevant to manufacturing of the motor M or the encoder 100, and radial shift of the disc 110 relative to the optical module 120 caused by misregistration of the rotation axial center AX due to aged deterioration of any component (e.g. a bearing supporting the shaft SH) in the motor M or the encoder 100 or bending or the like of the shaft SH by a burden or a load applied to the shaft SH.

Similarly in the circumferential direction C of the optical module 120, the disc 110 is projected on the optical module 120 to have a shape in the circumferential direction C influenced by the enlargement ratio ε. For easier comprehension, the circumferential direction C at the position of the light source 121 will be exemplified and specifically described as depicted in FIG. 2. In the circumferential direction C, the disc 110 has a circular shape around the rotation axial center Ax. The projection image on the optical module 120 has a center in the circumferential direction C apart by a distance εL in the radial direction of the disc 110 from an optical axis Op of the light source 121. The distance εL is obtained through enlargement, by the enlargement ratio ε, of a distance L between the rotation axial center AX and the optical axis Op. FIG. 2 conceptually indicates this position as a measurement center Os. In the circumferential direction C, the projection image on the optical module 120 is thus positioned on a line having a radius equal to the distance εL around the measurement center Os apart by the distance εL along the rotation axial center AX on a line including the optical axis Op and the rotation axial center AX from the optical axis Op.

FIG. 4 and FIG. 5 indicate correspondence in the circumferential direction C of the disc 110 and the optical module 120 with arc lines Lcd and Lcp, respectively. The line Lcd indicated in FIG. 4 corresponds to a line in the circumferential direction C on the disc 110, whereas the line Lcp indicated in FIG. 5 corresponds to a line in the circumferential direction C on the substrate BA (a line obtained by projecting the line Lcd on the optical module 120).

Assuming that the optical module 120 and the disc 110 have a gap G therebetween and the light source 121 protrudes from the substrate BA by a protrusion amount Δd as depicted in FIG. 2, the enlargement ratio ε is expressed by (equation 1).

$$\varepsilon = (2G - \Delta d)/(G - \Delta d) \quad \text{(Equation 1)}$$

The light receiving arrays according to the present embodiment are positioned correspondingly to the four slit tracks SA1, SA2, SI1, and SI2. The light receiving array PA1 is configured to receive light reflected at the slit track SA1, whereas the light receiving array PA2 is configured to receive light reflected at the slit track SA2. The light receiving arrays PIL1, PIL2, and PE are configured to receive light reflected at the slit track SI1, whereas the light receiving array PIH is configured to receive light reflected at the slit track SI2.

As depicted in FIG. 3, assume that the slit track SA1 has a center radius R1, the slit track SI1 has a center radius r1, the slit track SI2 has a center radius r2, and the slit track SA2 has a center radius R2. In the optical module 120 depicted in FIG. 5, the light receiving array PA1 has a center radius (a radius around the measurement center Os) εR1, the light receiving arrays PIL1, PIL2, and PE have a center radius εr1, the light receiving array PIH has a center radius εr2, and the light receiving array PA2 has a center radius εR2.

The light source 121, the light receiving arrays PA1 and PA2, and the light receiving arrays PIL1, PIL2, PE, and PIH are arranged to have positional relations depicted in FIG. 5. The light receiving arrays PA1 and PA2 corresponding to the absolute patterns are positioned to interpose the light source 121 in the radial direction R. According to this example, the light receiving array PA1 is positioned adjacent to an inner circumference whereas the light receiving array PA2 is positioned adjacent to an outer circumference. The light receiving arrays PA1 and PA2 are substantially equally distant from the light source 121 in the present embodiment.

The three light receiving arrays PIL1, PIL2, and PE corresponding to the incremental pattern are aligned in the circumferential direction C. The two light receiving arrays PIL1 and PIL2 are positioned separately from each other in the circumferential direction C, and the light receiving array PE is positioned between the two light receiving arrays PIL1 and PIL2. These three light receiving arrays PIL1, PIL2, and PE and the light receiving array PIH also corresponding to the incremental pattern are positioned between the light receiving array PA1 and the light receiving array PA2 and interpose the light source 121 in the radial direction R. According to this example, the light receiving arrays PIL1, PIL2, and PE are positioned adjacent to the inner circumference whereas the light receiving array PIH is positioned adjacent to the outer circumference. The light receiving arrays PE and PIH are substantially equally distant from the light source 121 in the present embodiment. Accordingly, the light receiving array PA1, the light receiving arrays PIL1, PIL2, and PE, the light source 121, the light receiving array PIH, and the light receiving array PA2 are positioned in the mentioned order from inside to outside in the radial direction R (from the inner circumference to the outer circumference).

The light receiving arrays PA1, PA2, PE, and PIH are each symmetric in the circumferential direction C with respect to, as a symmetry axis, a line Lr passing the optical axis Op of the light source 121 and extending in the radial direction R. The light receiving array PIL1 and the light receiving array PIL2 are shaped to be symmetric in the circumferential direction C with respect to the line Lr as the symmetry axis.

For example, the light receiving array PA1 (exemplifying a first absolute light receiver) includes 18 light receiving elements p1 and p2, receives light reflected at the slit track SA1 (exemplifying a first absolute slit row), and outputs first absolute signals having bit patterns of a half of the number of the light receiving elements (nine in the present embodiment). The light receiving array PA1 includes a plurality of first absolute light receiving elements p1 each configured to output the first absolute signal having a first phase, and a plurality of second absolute light receiving elements p2 each configured to output the first absolute signal having a second phase. The first absolute light receiving elements p1 and the second absolute light receiving elements p2 are alternately arranged in series in the circumferential direction C. The plurality of first absolute light receiving elements p1, as well as the plurality of second absolute light receiving elements p2 aligned in the circumferential direction C are different in phase (channel). In order to prevent complication, the first absolute light receiving elements p1 and the second absolute light receiving elements p2 are respectively denoted by same reference signs in FIG. 5 (also in FIG. 16 to be referred to later). According to this example, the light receiving elements p1 and the light receiving elements p2 have arrangement pitches corresponding to the minimum length (the pitch P1) in the circumferential direction C of the reflection slits in the slit track SA1 (the minimum length of the projection image: ε×P1), and the light receiving elements p1 and p2 have a length in the circumferential direction C equal to substantially a half of ε×P1. The light receiving elements p1 and p2 are thus offset in the circumferential direction C by a half of the length of one bit (corresponding to a half of the pitch P1). The first phase and the second phase accordingly have phase difference of 180 degrees in terms of an electrical angle (assuming that the incremental signal outputted from the light receiving array PI1 has one period of 360 degrees).

For example, the light receiving array PA2 (exemplifying a second absolute light receiver) includes 18 light receiving elements p3 and p4, receives light reflected at the slit track SA2 (exemplifying a second absolute slit row), and outputs second absolute signals having bit patterns of a half of the number of the light receiving elements (nine in the present embodiment). The light receiving array PA2 includes a plurality of third absolute light receiving elements p3 each configured to output the second absolute signal having a first phase, and a plurality of fourth absolute light receiving elements p4 each configured to output the second absolute signal having a second phase. The third absolute light receiving elements p3 and the fourth absolute light receiving elements p4 are alternately arranged in series in the circumferential direction C. The plurality of third absolute light receiving elements p3, as well as the plurality of fourth absolute light receiving elements p4 aligned in the circumferential direction C are different in phase (channel). In order to prevent complication, the third absolute light receiving elements p3 and the fourth absolute light receiving elements p4 are respectively denoted by same reference signs in FIG. 5 (also in FIG. 16 to be referred to later). According to this example, the light receiving elements p3 and the light receiving elements p4 have arrangement pitches corresponding to the minimum length (the pitch P1) in the circumferential direction C of the reflection slits in the slit track SA2 (the minimum length of the projection image: ε×P1), and the light receiving elements p3 and p4 have a length in the circumferential direction C equal to substantially a half of ε×P1. The light receiving elements p3 and p4 are thus offset in the circumferential direction C by a half of the length of one bit (corresponding to a half of the pitch P1).

As described above, the light receiving array PA1 and the light receiving array PA2 output two absolute signals having phase difference, to achieve the following effect. In the case of indicating the absolute position with the unidimensional absolute patterns as in the present embodiment, the absolute position may have lower detection accuracy in a region having a point of change in bit pattern caused by the light receiving elements in the light receiving array PA1 and the light receiving array PA2 positioned opposite to vicinity of ends of the reflection slits. In the present embodiment, the light receiving elements p1 and p2 in the light receiving array PA1 and the light receiving elements p3 and p4 in the light receiving array PA2 are each offset by the half of the length of one bit. In an exemplary case where the absolute position according to the light receiving elements p1 in the light receiving array PA1 (or the light receiving elements p3 in the light receiving array PA2) corresponds to a point of change in bit pattern, the absolute position is calculated in accordance with detection signals from the light receiving elements p2 in the light receiving array PA1 (or the light receiving elements p4 in the light receiving array PA2) or vice versa, for improvement in detection accuracy of the absolute position.

In such a configuration, the light receiving elements p1 and the light receiving elements p2 (or the light receiving elements p3 and the light receiving elements p4) are preferred to output signals substantially equal in magnitude in order for simplification in circuit configuration and signal processing by means of commonality of thresholds used for conversion of signals outputted from the light receiving elements to binary signals. Specifically, signals obtained by coupling signals outputted from the light receiving elements p1 and signals outputted from the light receiving elements p3 are preferred to have substantially equal magnitude for respective channels. Similarly, signals obtained by coupling signals outputted from the light receiving elements p2 and signals outputted from the light receiving elements p4 are preferred to have substantially equal magnitude for respective channels. In order to achieve the above configuration in the present embodiment, the light receiving elements p1 and p2 (or the light receiving elements p3 and p4) have light receiving areas gradually enlarged as distances from the light source 121 increase (increased in length in the radial direction R), to substantially equalize, for respective channels, received light quantity (obtained by adding light intensity at light receiving points in the light receiving areas) of the light receiving elements p1 and p3 and received light quantity of the light receiving elements p2 and p4.

As depicted in FIG. 2, the optical module 120 includes a first signal coupler 122 configured to generate a first phase signal by coupling the first absolute signal having the first phase and the second absolute signal having the first phase, and a second signal coupler 123 configured to generate a second phase signal by coupling the first absolute signal having the second phase and the second absolute signal having the second phase. The first phase signal and the second phase signal will hereinafter be called a "phase A absolute signal" and a "phase B absolute signal", respectively, where appropriate. The phase A absolute signal and the phase B absolute signal have phase difference of 180 degrees in terms of an electrical angle (assuming that the incremental signals outputted from the light receiving arrays PIL1 and PIL2 have one period of 360 degrees). The first signal coupler 122 is constituted by signal wiring (not depicted) provided on the substrate BA and electrically connecting, for example, the light receiving elements p1 in the light receiving array PA1 and the light receiving elements p3 in the light receiving array PA2. Similarly, the second signal coupler 123 is constituted by signal wiring (not depicted) provided on the substrate BA and electrically connecting, for example, the light receiving elements p2 in the light receiving array PA1 and the light receiving elements p4 in the light receiving array PA2.

Each of the first signal coupler 122 and the second signal coupler 123 may alternatively be constituted by the signal wiring For example, the light receiving elements p1 and p3 may be partially extended to be connected to each other and the light receiving elements p2 and p4 may be partially extended to be connected to each other, so as to couple the absolute signals within the light receiving elements. Still alternatively, the light receiving elements p1 and p3 and the light receiving elements p2 and p4 may individually output absolute signals having phase difference, and the signals may be coupled through signal processing executed by the signal processor 130.

This configuration achieves cancellation of a phase shift between the first absolute signal and the second absolute signal caused by misregistration in the circumferential direction around the optical axis Op of the optical module 120, for reduction in influence thereof.

In order for accurate cancellation of the phase shift between the first absolute signal and the second absolute signal through the signal coupling, the first absolute signal outputted from the light receiving array PA1 and the second absolute signal outputted from the light receiving array PA2 are preferred to be equal in magnitude (e.g. amplitude, a voltage value, or a current value). In order to achieve the above configuration in the present embodiment, the light receiving elements p1 and p2 (or the light receiving elements p3 and p4) have the light receiving areas gradually enlarged as the distances from the light source 121 increase (increased in length in the radial direction R), to substantially equalize the received light quantity (obtained by adding light intensity at the light receiving points in the light receiving areas) of the light receiving elements p1 and p3 for an identical channel (or the light receiving elements p2 and p4 for an identical channel). Examples of a method of substantially equalizing the received light quantity include, in addition to adjusting the light receiving areas of the light receiving elements p1 and p3 (or the light receiving elements p2 and p4), adjusting positions of the light receiving elements p1 and p3 (or the light receiving elements p2 and p4), and adjusting gains of the light receiving elements p1 and p3 (or the light receiving elements p2 and p4). Adjusting the light receiving areas as in the present embodiment does not need provision of any separate circuit or any vacant space to save a space therefor.

The light receiving arrays PIL1 and PIL2 are positioned between the light receiving array PA1 and the light source 121 in the radial direction R. The light receiving array PIH is positioned between the light source 121 and the light receiving array PA2 in the radial direction R. The light receiving arrays PIL1 and PIL2 (exemplifying a first light receiver and a first incremental light receiver) include a plurality of light receiving elements p5 (exemplifying first light receiving elements) aligned in the circumferential direction C to respectively receive light reflected by the reflection slits si1 in the slit track SI1 (exemplifying a slit row, specifically the first incremental slit row). The light receiving array PIH (exemplifying a second incremental light receiver) includes a plurality of light receiving elements p6 aligned in the circumferential direction C to respectively receive light reflected by the reflection slits si2 in the slit track SI2 (exemplifying the second incremental slit row). The light receiving arrays PIL1 and PIL2 will initially be described exemplarily.

In the present embodiment, a set (denoted by "SET1" in FIG. 5) of totally four light receiving elements p5 are aligned in one pitch in the incremental pattern in the circumferential direction of the slit track SI1 (one pitch in the projection image, i.e. ε×P1), and a plurality of sets of the four light receiving elements p5 is further aligned in the circumferential direction C. The incremental pattern includes the reflection slits repetitively provided for each pitch. When the disc 110 rotates, each of the light receiving elements thus generates a periodic signal having one period (360 degrees in terms of an electrical angle) for one pitch. One set corresponding to one pitch includes the four light receiving elements, so that the light receiving elements adjacent to each other in the one set are configured to detect periodic signals mutually having phase difference of 90 degrees. These light receiving signals will be called a phase A+ signal, a phase B+ signal (having phase difference of 90 degrees from the phase A+ signal), a phase A− signal (having phase difference of 180 degrees from the phase A+ signal), and a phase B− signal (having phase difference of 180 degrees from the phase B+ signal).

The incremental pattern indicates a position in one pitch, so that signals having the respective phases in one set and signals having the respective phases in a different set corresponding thereto have similarly changing values. The signals equal in phase will thus be added for the plurality of sets. The large number of light receiving elements in the light receiving arrays PIL1 and PIL2 depicted in FIG. 5 thus detect four signals having phase difference of 90 degrees.

Part of the plurality of light receiving elements p5 included in the light receiving arrays PIL1 and PIL2 (e.g. four light receiving elements adjacent to a circumferentially outer end of the light receiving array PIL1 and four light receiving elements adjacent to a circumferentially outer end of the light receiving array PIL2; the number may not be four) may be configured as light receiving elements for light quantity adjustment. In this case, light receiving signals outputted from the light receiving elements are added to generate a light quantity adjustment signal having substantially constant amplitude, and quantity of light emitted from the light source 121 is adjusted in accordance with the light quantity adjustment signal.

The light receiving array PIH is configured similarly to the light receiving arrays PIL1 and PIL2. Specifically, a set (denoted by "SET2" in FIG. 5) of totally four light receiving elements are aligned in one pitch in the incremental pattern of the slit track SI2 (one pitch in the projection image, i.e. ε×P3), and a plurality of sets of the four light receiving elements is aligned in the circumferential direction C. Each of the light receiving arrays PIL1, PIL2, and PIH accordingly generates four signals having phase difference of 90 degrees. These four signals will be called "incremental signals". The incremental signals generated in the light receiving array PIH corresponding to the slit track SI2 having a short pitch will be called "high incremental signals" (exemplifying second incremental signals) being higher in resolution than the remaining incremental signals. The incremental signals generated in the light receiving arrays PIL1 and PIL2 corresponding to the slit track SI1 having a long pitch will be called "low incremental signals" (exemplifying first light receiving signals or first incremental signals) being lower in resolution than the remaining incremental signals.

The light receiving array PE is positioned between the light receiving array PA1 and the light source 121 in the radial direction R, as well as between the light receiving arrays PIL1 and PIL2 in the circumferential direction C. The light receiving array PE (exemplifying a second light receiver) includes a plurality of light receiving elements p7 (exemplifying second light receiving elements) aligned in the radial direction R to respectively receive light reflected by the reflection slits si1 in the slit track SI1 (exemplifying a slit row, specifically the first incremental slit row).

In the present embodiment, a set (denoted by "SET3" in FIG. 5) of totally four light receiving elements p7 are aligned in one pitch in the incremental pattern in the radial direction of the slit track SI1 (one pitch in the projection image, i.e. ε×P2), and a plurality of sets of the four light receiving elements p7 is further aligned in the radial direction R. The incremental pattern includes the reflection slits repetitively provided for each pitch. When the disc 110 is eccentric to shift in the radial direction, each of the light receiving elements thus generates a periodic signal having one period for one pitch (360 degrees in terms of an electrical angle). One set corresponding to one pitch includes the four light receiving elements, so that the light receiving elements adjacent to each other in the one set are configured to detect periodic signals mutually having phase difference of 90 degrees. These light receiving signals will be called a phase SA+ signal, a phase SB+ signal (having phase difference of 90 degrees from the phase SA+ signal), a phase SA− signal (having phase difference of 180 degrees from the phase SA+ signal), and a phase SB− signal (having phase difference of 180 degrees from the phase SB+ signal).

The incremental pattern indicates a position in one pitch, so that signals having the respective phases in one set and signals having the respective phases in a different set corresponding thereto have similarly changing values. The signals equal in phase will thus be added for the plurality of sets. The large number of light receiving elements in the light receiving array PE depicted in FIG. 5 thus detect four signals having phase difference of 90 degrees. These four signals are called "eccentricity signals" (exemplifying second light receiving signals).

The present embodiment exemplifies the case where one set corresponding to one pitch in the incremental pattern includes four light receiving elements. However, the number of light receiving elements included in one set should not be particularly limited and one set may alternatively include two light receiving elements, for example.

As depicted in FIG. 5, the optical module 120 includes a first position adjustment light receiving element 124 and a second position adjustment light receiving element 125. The first position adjustment light receiving element 124 is positioned adjacent to a first end (where the first absolute light receiving element p1 is positioned at an end) of the light receiving array PA1 in the circumferential direction C, and is configured to receive light emitted from the light source 121 and reflected at the slit track SA1 and output a first position adjustment signal. The second position adjustment light receiving element 125 is positioned adjacent to a first end (where the third absolute light receiving element p3 is positioned at an end) of the light receiving array PA2 in the circumferential direction C, and is configured to receive light emitted from the light source 121 and reflected at the slit track SA2 and output a second position adjustment signal.

The first position adjustment signal and the second position adjustment signal are individually outputted from the optical module 120 without being coupled to each other, and are used for position adjustment upon attachment of the optical module 120. Specifically, positional change in the circumferential direction around the optical axis of the optical module 120 appears as phase difference of the first position adjustment signal and the second position adjustment signal. The position in the circumferential direction of the optical module 120 can thus be accurately adjusted in accordance with the phase difference. Positional change in the disc radial direction of the optical module 120 appears as change in amplitude of the first position adjustment signal and the second position adjustment signal. The position in the radial direction of the optical module 120 may thus be adjusted in accordance with the change in amplitude.

In order for simplification in circuit configuration and signal processing by means of commonality of thresholds used for conversion of signals outputted from the light receiving elements to binary signals, the first position adjustment signal outputted from the first position adjustment light receiving element 124 and the second position adjustment signal outputted from the second position adjustment light receiving element 125 are preferred to be equal in magnitude (e.g. amplitude, a voltage value, or a current value) to the phase A absolute signal generated by coupling the light receiving signal of one of the light receiving elements p1 and the light receiving signal of one of the light receiving elements p3 and the phase B absolute signal generated by coupling the light receiving signal of one of the light receiving elements p2 and the light receiving signal of one of the light receiving elements p4. In order to achieve such magnitude of the first position adjustment signal and the second position adjustment signal in the present embodiment, the first position adjustment light receiving element 124 and the second position adjustment light receiving element 125 are set to have light receiving areas of predetermined sizes (e.g. substantially two times of the light receiving elements p1 and p3 at the ends of the light receiving arrays PA1 and PA2).

Alternatively, the first position adjustment light receiving element 124 may be positioned adjacent to a second end (where the second absolute light receiving element p2 is positioned at an end) instead of the first end of the light receiving array PA1 (indicated by an imaginary line in FIG. 5), or may be positioned adjacent to each of the first and second ends of the light receiving array PA1. Similarly, the second position adjustment light receiving element 125 may be positioned adjacent to a second end (where the fourth absolute light receiving element p4 is positioned at an end) instead of the first end of the light receiving array PA2 (indicated by an imaginary line in FIG. 5), or may be positioned adjacent to each of the first and second ends of the light receiving array PA2. In the case where the first position adjustment light receiving element 124 and the second position adjustment light receiving element 125 are positioned adjacent to each of the both ends of the light receiving arrays PA1 and PA2, respectively, position adjustment can be double checked with two systems and the light receiving elements at the both ends in the circumferential direction of the light receiving arrays PA1 and PA2 secure well-balanced light receiving quantity, for higher reliability of the first absolute signal and the second absolute signal.

2-3. Signal Processor

The signal processor 130 executes predetermined signal processing in accordance with light receiving signals from the light receiving arrays PA1, PIL1, PIL2, PE, PIH, and PA2. Initially described is processing of generating positional data.

The signal processor 130 acquires, from the optical module 120, two absolute signals (the phase A absolute signal and the phase B absolute signal) each having a bit pattern indicating the absolute position, and high incremental signals and low incremental signals including four signals having phase difference of 90 degrees, upon measurement of the absolute position of the motor M. In accordance with one selected from the two absolute signals and two incremental signals, the signal processor 130 calculates the absolute position of the motor M indicated by these signals, generates positional data indicating the absolute position, and outputs the positional data to the controller CT. After measurement of the absolute position (e.g. after the motor M starts rotating after the encoder 100 is powered ON), the signal processor 130 generates positional data in accordance with the absolute position thus calculated, and a relative position calculated in accordance with the high incremental signals and the low incremental signals, and outputs the positional data to the controller CT.

The signal processor 130 can generate positional data in accordance with any one of various methods with no particular limitation. Described herein is the case where the absolute position is calculated in accordance with the high incremental signals, the low incremental signals, and the absolute signals to generate positional data.

Figure 6:
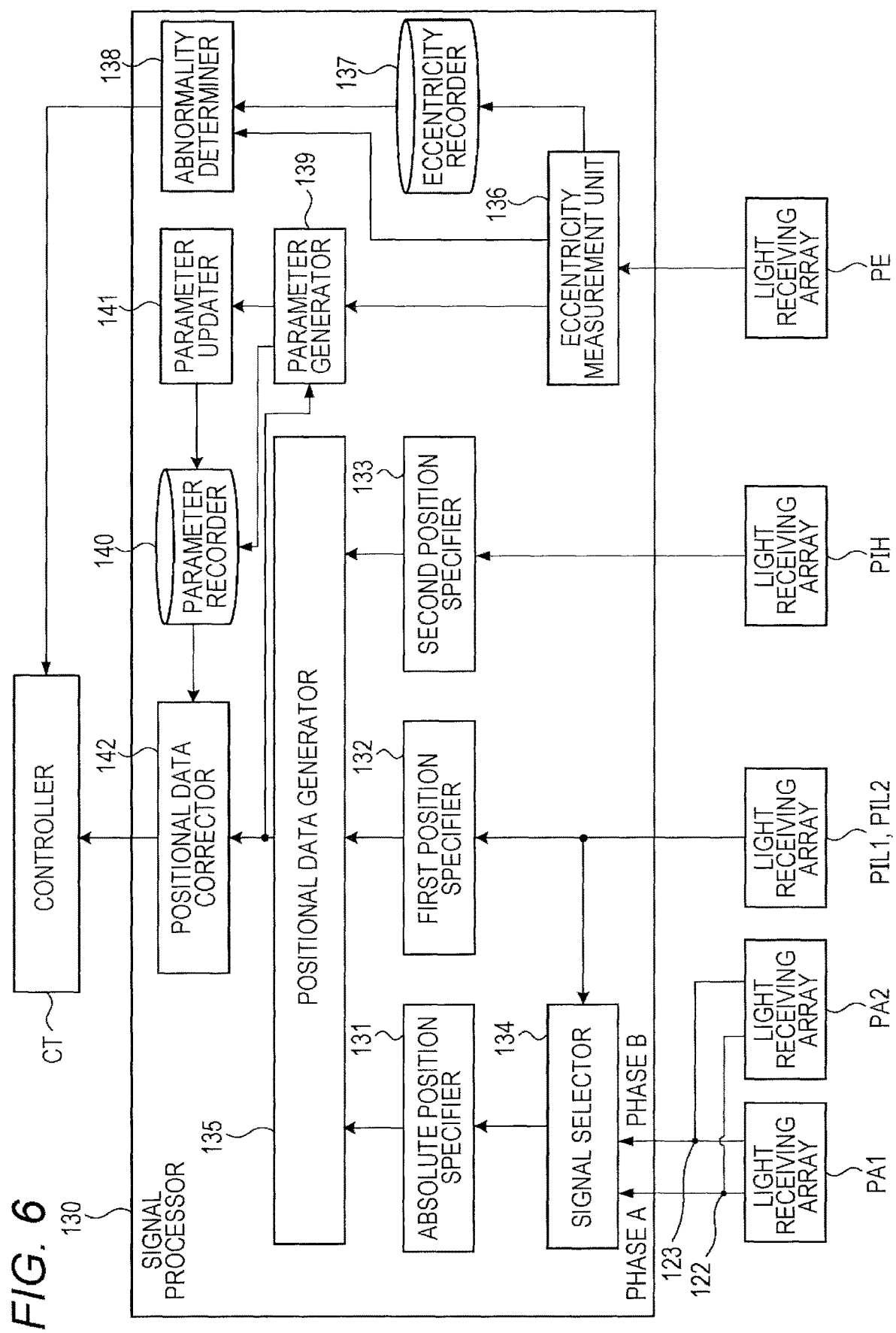
FIG. 6 is a block diagram depicting an exemplary functional configuration of a signal processor.

As depicted in FIG. 6, the signal processor 130 includes an absolute position specifier 131, a first position specifier 132, a second position specifier 133, a signal selector 134, and a positional data generator (positional data generating circuitry) 135.

The absolute position specifier 131 includes a comparator (not depicted). The comparator compares amplitude of the phase A absolute signal or the phase B absolute signal selected by the signal selector 134 with a predetermined threshold. The comparator binarizes assuming detection if the amplitude exceeds the threshold and undetection if the amplitude does not exceed the threshold, for conversion to bit data indicating the absolute position. The absolute position specifier 131 specifies the absolute position in accordance with correspondence between the predetermined bit data and the absolute position.

The signal selector 134 selects one of the phase A absolute signal and the phase B absolute signal in accordance with the incremental signals from the light receiving arrays PIL1 and PIL2. Details thereof will be described below.

Figure 7:
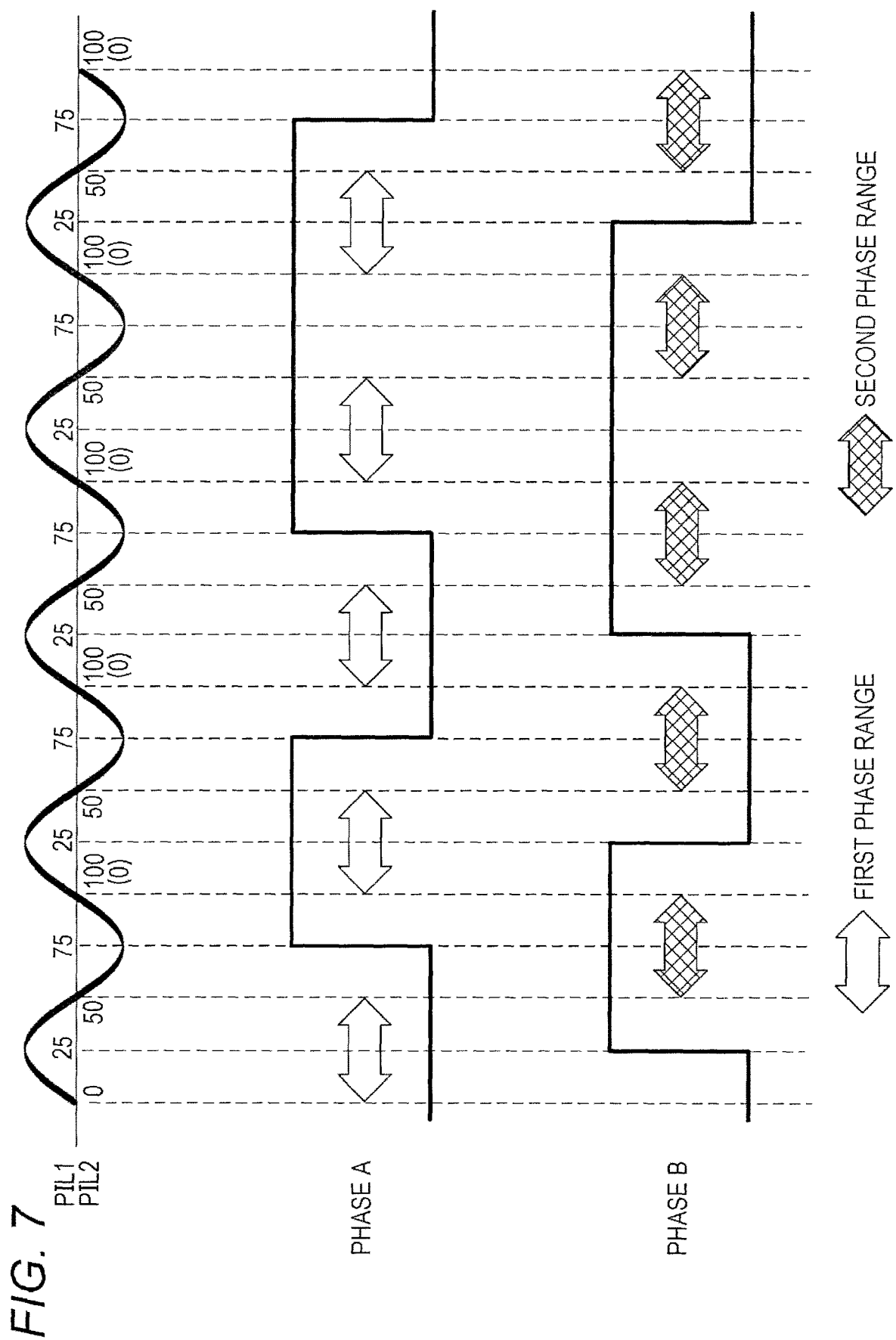
FIG. 7 is an explanatory view depicting exemplary waveforms of a low incremental signal, a phase A absolute signal, and a phase B absolute signal.

FIG. 7 is an explanatory view indicating an exemplary waveform of each of the light receiving signals in this case. FIG. 7 depicts an upper waveform having a sine wave shape exemplifying a waveform of one of the four incremental signals outputted from the light receiving arrays PIL1 and PIL2. The waveform is provided with numbers indicating magnitude of the phase assuming that one period (360 degrees in terms of an electrical angle) corresponds to 100%. A middle pulse waveform exemplifies a waveform of the phase A absolute signal. A lower pulse waveform exemplifies a waveform of the phase B absolute signal.

As exemplified in FIG. 7, the waveform of the phase B absolute signal has points of change between ON and OFF when the incremental signals of the light receiving arrays PIL1 and PIL2 have a phase of 25%. As described earlier, the phase A absolute signal and the phase B absolute signal have phase difference of 180 degrees in terms of an electrical angle. The waveform of the phase A absolute signal is thus shifted in phase by 50% from the waveform of the phase B absolute signal (delayed in phase in this example).

In this case, in a phase range from 0% to 50%, the phase A absolute signal is stabler in amplitude than the phase B absolute signal. This phase range will hereinafter be referred to as a first phase range (indicated by double-pointed arrows in white in FIG. 7). In a phase range from 50% to 100%, the phase B absolute signal is stabler in amplitude than the phase A absolute signal. This phase range will hereinafter be referred to as a second phase range (indicated by double-pointed arrows cross-hatched in FIG. 7).

The signal selector 134 receives the low incremental signals from the light receiving arrays PIL1 and PIL2. The signal selector 134 selects the phase A absolute signal if the low incremental signals have phases in the first phase range, and selects the phase B absolute signal if the low incremental signals have phases in the second phase range. The absolute position can thus be specified in accordance with the absolute signal not provided in a region with unstable amplitude such as a point of change in detection pattern, to achieve improvement in detection accuracy.

The first position specifier 132 mutually subtracts the low incremental signals having phase difference of 180 degrees out of the low incremental signals having four phases from the light receiving arrays PIL1 and PIL2. Subtraction of the signals having phase difference of 180 degrees achieves an offset of a manufacturing error, a measurement error, or the like of the reflection slits in one pitch. The signals obtained by the subtraction described above will be called herein the "first incremental signal" and the "second incremental signal". The first incremental signal and the second incremental signal mutually have phase difference of 90 degrees in terms of an electrical angle. The first position specifier 132 thus specifies a position in one pitch in accordance with these two signals. The position in one pitch is specified in accordance with a method not particularly limited. In an exemplary case where the low incremental signals as periodic signals are sinusoidal signals, examples of the specifying method include arctan arithmetic of a division result of the two sinusoidal signals having the phase A and the phase B for calculation of an electrical angle $\varphi$. The examples of the method also include converting the two sinusoidal signals into the electrical angles $\varphi$ with use of a tracking circuit. The examples of the method further include specifying the electrical angles $\varphi$ associated with values of the phase A signal and the phase B signal in a preliminarily prepared table. In this case, the first position specifier 132 is preferred to execute analog-digital conversion of the two sinusoidal signals having the phase A and the phase B for each detection signal.

The second position specifier 133 applies, to the high incremental signals from the light receiving array PIH, processing similar to that of the first position specifier 132, and specifies a more accurate position in one pitch in accordance with the two signals.

The positional data generator 135 superimposes the position in one pitch specified by the first position specifier 132 on the absolute position specified by the absolute position specifier 131. This achieves calculation of the absolute position higher in resolution than the absolute position according to the absolute signals. The positional data generator 135 further superimposes the position in one pitch specified by the second position specifier 133 on the absolute position calculated in accordance with the low incremental signals. This achieves calculation of the absolute position still higher in resolution than the absolute position calculated in accordance with the low incremental signal s.

The positional data generator 135 multiplies the absolute position thus calculated for further improvement in resolution, and then outputs, to the controller CT, as positional data indicating the highly accurate absolute position.

Described next is processing of measuring eccentricity of the disc 110 and correcting the positional data. As depicted in FIG. 6, the signal processor 130 includes an eccentricity measurement unit (eccentricity measurement circuitry) 136, an eccentricity recorder 137, an abnormality determiner (abnormality determining circuitry) 138, a parameter generator (parameter generating circuitry) 139, a parameter recorder 140, a parameter updater 141, and a positional data corrector 142.

The eccentricity measurement unit 136 measures eccentricity as a shift amount in the radial direction during single rotation of the disc 110, in accordance with the eccentricity signals from the light receiving array PE. The "eccentricity" in the present embodiment include both a radial shift amount of the disc 110 caused by eccentricity between the rotation axial center AX of the shaft SH and the disc center O of the disc 110 due to an error, a tolerance, or the like relevant to manufacturing of the motor M or the encoder 100, and a radial shift amount of the disc 110 caused by aged deterioration of any component (e.g. a bearing supporting the shaft SH) in the motor M or the encoder 100, or misregistration of the rotation axial center AX caused by bending or the like of the shaft SH due to a burden or a load applied to the shaft. The eccentricity is measured at predetermined measurement timing. Examples of the "predetermined measurement timing" include timing appropriately specified by a user such as upon factory shipment or upon maintenance of the encoder 100 (the servomotor SM), at constant intervals (the intervals can be appropriately specified by the user), and at constant timing (e.g. every several seconds).

Figure 8:
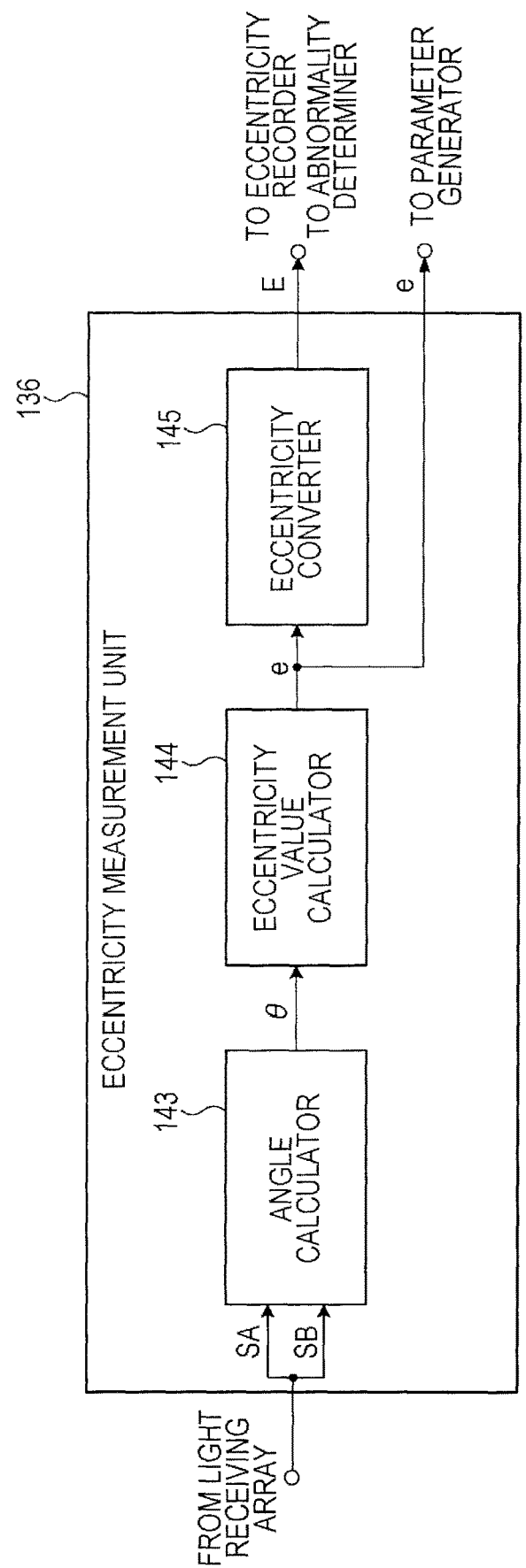
FIG. 8 is a block diagram depicting an exemplary functional configuration of an eccentricity measurement unit.

As depicted in FIG. 8, the eccentricity measurement unit 136 includes an angle calculator 143, an eccentricity value calculator 144, and an eccentricity converter 145. The eccentricity measurement unit 136 mutually subtracts the eccentricity signals having phase difference of 180 degrees, specifically, the phase SA+ signal and the phase SA− signal, and the phase SB+ signal and the phase SB− signal, out of the eccentricity signals (the phase SA+ signal, the phase SB+ signal, the phase SA− signal, and the phase SB− signal) having the four phases and received from the light receiving array PE. Signals obtained by the subtraction will hereinafter be referred to as a "phase A eccentricity signal SA" and a "phase B eccentricity signal SB". The phase A eccentricity signal SA and the phase B eccentricity signal SB mutually have phase difference of 90 degrees in terms of an electrical angle.

The angle calculator 143 acquires the phase A eccentricity signal SA and the phase B eccentricity signal SB, and applies arctan arithmetic or the like to calculate an electrical angle $\theta$. The electrical angle $\theta$ may be specified, instead of the arctan arithmetic, with use of a tracking circuit, in accordance with a preliminarily prepared table, or the like. The phase A eccentricity signal SA and the phase B eccentricity signal SB may be appropriately corrected (e.g. offset correction or amplitude correction) before the angle calculator 143 acquires the phase A eccentricity signal SA and the phase B eccentricity signal SB.

The eccentricity value calculator 144 calculates an eccentricity value e (exemplifying eccentricity) from the electrical angle $\theta$ and the pitch P2 (in micrometers or the like) in the radial direction of the slit track SI1 in accordance with (equation 2).

$$e = \theta/360° \times P2 \qquad \text{(Equation 2)}$$

The eccentricity converter 145 specifies a maximum value e max and a minimum value e min from eccentricity values e during single rotation of the disc 110, and calculates eccentricity E in accordance with (equation 3).

$$E = e\,\text{max} - e\,\text{min} \qquad \text{(Equation 3)}$$

The eccentricity measurement unit 136 transmits the eccentricity E thus calculated to the eccentricity recorder 137 and the abnormality determiner 138, and transmits the eccentricity value e to the parameter generator 139.

With reference to FIG. 6 again, the eccentricity recorder 137 (exemplifying a first recorder) records the eccentricity E measured by the eccentricity measurement unit 136. Examples of the eccentricity recorder 137 include a non-volatile memory configured to hold data even during no power supply or the like. The eccentricity recorder 137 records the eccentricity E measured by the eccentricity measurement unit 136 upon factory shipment (without application of any burden) of the encoder 100 (the servomotor SM) or at appropriate timing specified by the user after the servo system S operates.

The abnormality determiner 138 compares the eccentricity E measured by the eccentricity measurement unit 136 and the eccentricity E recorded in the eccentricity recorder 137 (hereinafter, referred to as "eccentricity E0" where appropriate), and determines whether or not there is abnormality relevant to eccentricity. The abnormality determination is executed at predetermined determination timing. Examples of the "predetermined determination timing" include timing appropriately specified by the user such as upon maintenance, at constant intervals (the intervals can be appropriately specified by the user) and constant timing (e.g. every several seconds). The abnormality determiner 138 calculates a deviation dE (dE=E−E0) of eccentricity from difference between the eccentricity E measured by the eccentricity measurement unit 136 while the servo system S is in normal operation or the like and the eccentricity E0 recorded upon factory shipment of the encoder 100 (the servomotor SM), and compares the deviation dE and a threshold to determine abnormality in an exemplary case where the deviation dE is equal to or more than a threshold TH1 and determine no abnormality in another case where the deviation dE is less than the threshold TH1. The threshold TH1 can be appropriately set by the user in accordance with required specifications, operating environment, or the like. The abnormality determiner 138 transmits a result of the determination to the controller CT upon determination of abnormality, and the controller CT executes appropriate abnormality processing such as issue of an alarm or warning, or emergency stop.

The parameter generator 139 generates a correction parameter for correction of a positional data error caused by the disc 110 being eccentric, in accordance with the eccentricity value e measured by the eccentricity measurement unit 136. The correction parameter is generated at predetermined generation timing. Examples of the "predetermined generation timing" include timing appropriately specified by the user such as upon factory shipment or upon maintenance of the encoder 100 (the servomotor SM), at constant intervals (the intervals can be appropriately specified by the user), and constant timing (e.g. every several seconds).

Figure 9:
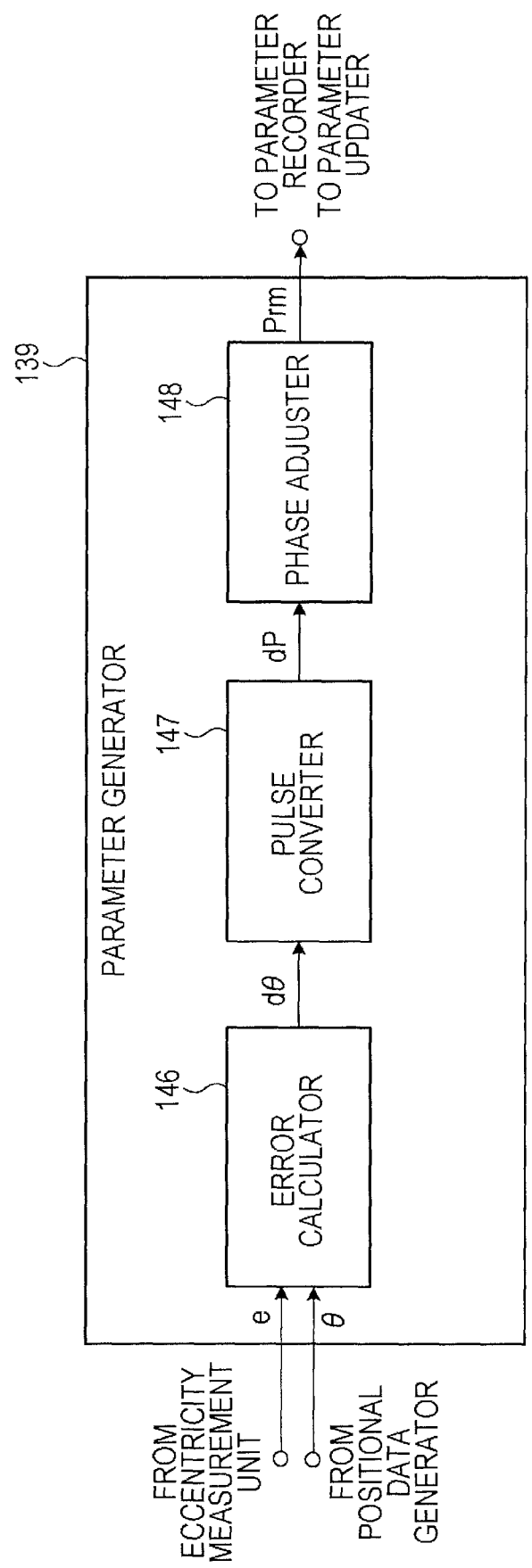
FIG. 9 is a block diagram depicting an exemplary functional configuration of a parameter generator.

As depicted in FIG. 9, the parameter generator 139 includes an error calculator 146, a pulse converter 147, and a phase adjuster 148. The error calculator 146 acquires the eccentricity value e for single rotation of the disc 110 measured by the eccentricity measurement unit 136, and calculates an angular error dθ for single rotation of the disc 110 from a radius Rd of the disc 110 in accordance with (equation 4).

$$d\theta = \arctan(e/Rd) \qquad \text{(Equation 4)}$$

The pulse converter 147 converts the angular error dθ to a pulse error dP for single rotation of the disc 110 corresponding to resolution Or (bits) of the encoder 100 from the resolution Or of the encoder 100 in accordance with (equation 5). Such pulse conversion processing is not needed in a case where the parameter is directly generated from the angular error dθ without pulse conversion.

$$dP = d\theta/360° \times 2^{\wedge}Or \qquad \text{(Equation 5)}$$

The phase adjuster 148 adjusts a phase of the pulse error dP in accordance with (equation 6) and (equation 7), and converts to a correction parameter Pun for single rotation of the disc 110. Specifically, an error caused by being eccentric corresponds to a primary component of a sine wave with respect to positional data θ during single rotation of the disc 110 generated by the positional data generator 135. Accordingly, only the primary component of the sine wave is extracted through FFT processing from the pulse error dP for single rotation and the positional data θ. Assume that the pulse error has a maximum value A and the phase has an offset α. The pulse error dP calculated from the eccentricity value e is caused by a shift in the radial direction R of the disc 110 (a shift along the line Lr), whereas an error affecting measurement accuracy of positional data is caused by a shift in the circumferential direction C of the disc 110. The phase adjuster 148 thus adjusts the phase by shifting the phase of the pulse error dP by 90 degrees. The signal processor 130 can thus measure eccentricity of the disc 110 in the radial direction R and execute correction in the circumferential direction C. The pulse error dP after phase adjustment may be positive/negative inverted as necessary.

$$dP = A\sin(\theta + \alpha) \qquad \text{(Equation 6)}$$

$$Prm = A\sin(\theta - 90° + \alpha) \qquad \text{(Equation 7)}$$

The parameter generator 139 transmits the correction parameter Prm thus generated to the parameter recorder 140 and the parameter updater 141.

With reference to FIG. 6 again, the parameter recorder 140 (exemplifying a second recorder) records the correction parameter Prm generated by the parameter generator 139. Examples of the parameter recorder 140 include a nonvolatile memory configured to hold data even during no power supply or the like. The parameter recorder 140 records the correction parameter Prm generated by the parameter generator 139 upon factory shipment (without application of any burden) of the encoder 100 (the servomotor SM) or at appropriate timing specified by the user after the servo system S operates.

The parameter updater 141 updates the correction parameter Prm recorded in the parameter recorder 140 to the correction parameter Prm newly generated by the parameter generator 139 at predetermined update timing. Examples of the "predetermined update timing" include timing appropriately specified by the user such as upon maintenance, at constant intervals (the intervals can be appropriately specified by the user), and constant timing (e.g. every several seconds). Alternatively, the eccentricity E or the eccentricity value e measured by the eccentricity measurement unit 136 at appropriate timing after the servo system S operates may be compared with the eccentricity E or the eccentricity value e in the past (e.g. upon factory shipment) recorded in the eccentricity recorder 137, and the predetermined update timing may be set when difference therebetween becomes larger than a predetermined threshold.

The positional data corrector 142 corrects the positional data generated by the positional data generator 135 in accordance with the correction parameter Prm recorded in the parameter recorder 140. This correction is executed by adding or subtracting the correction parameter having a phase corresponding to the positional data. The positional data corrector 142 may execute phase adjustment (e.g. adding or subtracting with reference to the correction parameter having a phase shifted by 90 degrees from the phase of the positional data to be corrected). In this case, the parameter generator 139 does not need to include the phase adjuster 148. The positional data thus corrected is transmitted from the signal processor 130 to the controller CT.

There may be provided an "ON mode" for execution of processing including measuring the eccentricity and correcting the positional data and an "OFF mode" for no execution, so that the user can switch between these modes. Specifically, the eccentricity measurement unit 136, the eccentricity recorder 137, the abnormality determiner 138, the parameter generator 139, the parameter recorder 140, the parameter updater 141, and the positional data corrector 142 may execute the processing in the "ON mode", whereas the processing may be stopped in the "OFF mode".

The processing executed by the respective processing units included in the signal processor 130 is not limitedly assigned as exemplified above, and any smaller number of processing units (e.g. a single processing unit) may execute the processing or further segmented processing units may execute the processing. Functions of the signal processor 130 may be implemented by programs executed by a CPU 901 (see FIG. 24) to be described later, or the functions may partially or entirely be implemented by actual devices such as an ASIC, an FPGA, or any other electric circuit.

2-4. Procedure for Measurement of Eccentricity and Correction of Positional Data Described next is an exemplary procedure for eccentricity measurement and positional data correction executed by the signal processor 130.

FIG. 10 is a flowchart depicting an exemplary procedure for eccentricity recording. This flow may be executed upon factory shipment of the encoder 100 (the servomotor SM). The encoder can thus internally hold the eccentricity value e or the eccentricity E corresponding to eccentricity between the disc center O of the disc 110 and the rotation axial center AX of the shaft SH due to an error, a tolerance, or the like relevant to manufacturing of the encoder 100 (the servomotor SM). This flow may be executed not upon factory shipment but at timing appropriately specified by the user such as upon maintenance after the servo system S operates, or at constant intervals (the intervals can be appropriately specified by the user). This flow is executed in the state where a burden is applied to the shaft SH, so that the encoder can internally hold the eccentricity between the disc 110 and the shaft SH upon factory shipment, as well as the eccentricity value e or the eccentricity E corresponding to misregistration of the rotation axial center AX of the shaft SH due to a burden, aged deterioration, or the like.

Figure 12:
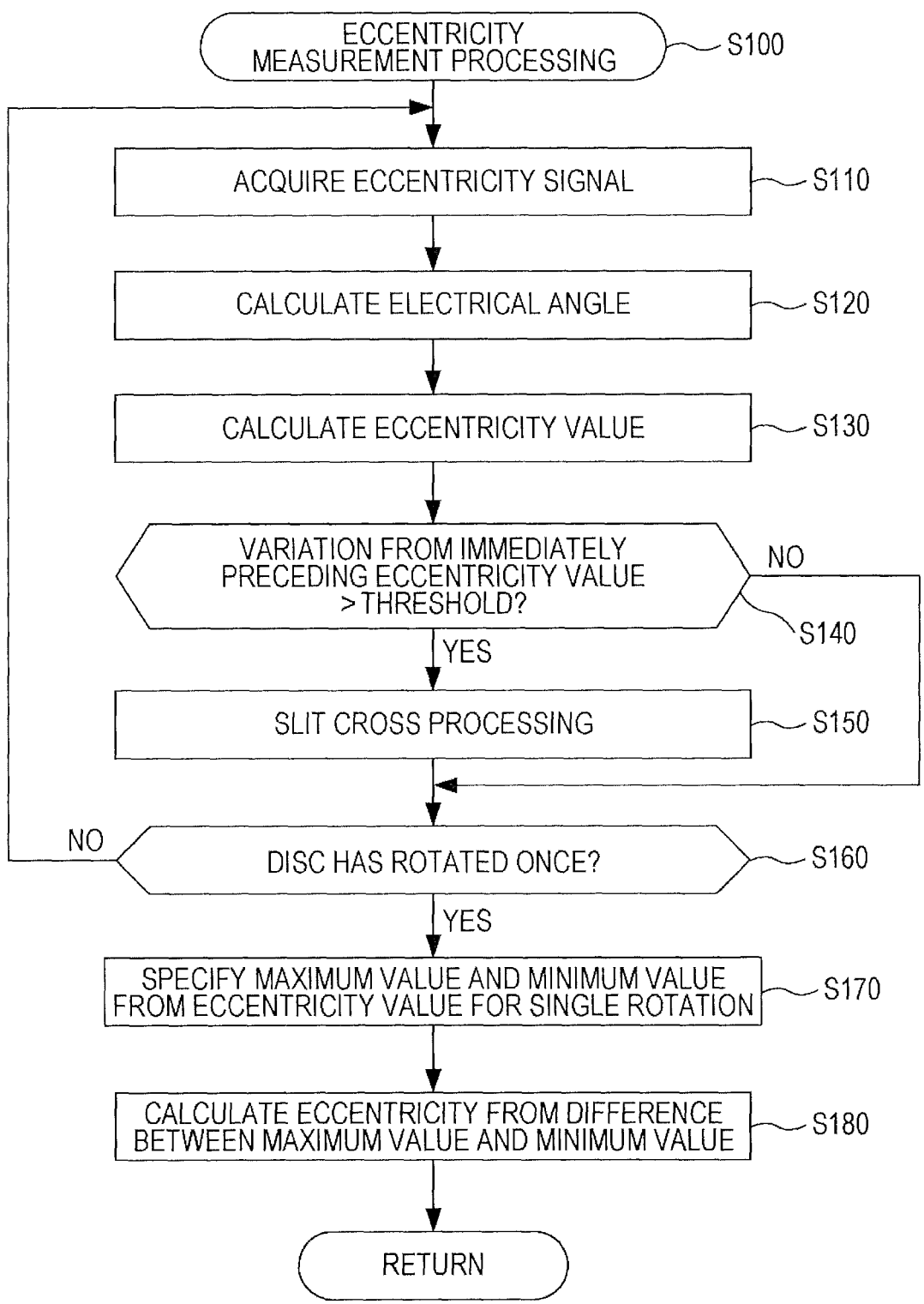
FIG. 12 is a flowchart depicting details of eccentricity measurement processing.

In step S100, the signal processor 130 causes the eccentricity measurement unit 136 to execute processing (eccentricity measurement processing) of measuring the eccentricity E having a shift amount in the radial direction during single rotation of the disc 110, in accordance with the eccentricity signals from the light receiving array PE. The eccentricity measurement processing will be described in detail later (FIG. 12).

In step S1, the signal processor 130 causes the eccentricity recorder 137 to record the eccentricity E measured in step S100. The present flow is then completed.

FIG. 11 is a flowchart depicting an exemplary procedure for eccentricity abnormality determination. This flow is executed at timing appropriately specified by the user such as upon maintenance after the servo system S operates, at constant intervals (the intervals can be appropriately specified by the user), or at constant timing (e.g. every several seconds).

In step S100, the signal processor 130 causes the eccentricity measurement unit 136 to execute processing (eccentricity measurement processing) of measuring the eccentricity E having a shift amount in the radial direction during single rotation of the disc 110, in accordance with the eccentricity signals from the light receiving array PE. The eccentricity measurement processing will be described in detail later (FIG. 12).

In step S11, the signal processor 130 causes the abnormality determiner 138 to refer to the eccentricity E0 recorded in the eccentricity recorder 137 upon factory shipment or the like, and calculate the deviation dE (dE=E−E0) of eccentricity from the eccentricity E calculated in step S100 and the eccentricity E0.

In step S12, the signal processor 130 causes the abnormality determiner 138 to determine whether or not the deviation dE calculated in step S11 is equal to or more than the threshold TH1. The flow returns to step S100 in a case where the deviation dE is less than the threshold TH1 (NO in step S12). The flow proceeds to step S13 in another case where the deviation dE is equal to or more than the threshold TH1 (YES in step S12).

In step S13, the signal processor 130 causes the abnormality determiner 138 to determine abnormality and transmit a result of the determination to the controller CT. The controller CT accordingly executes appropriate abnormality processing such as issue of an alarm or warning, or emergency stop. The present flow is then completed.

FIG. 12 is a flowchart depicting details of the eccentricity measurement processing in step S100.

In step S110, the signal processor 130 causes the angle calculator 143 in the eccentricity measurement unit 136 to acquire the phase A eccentricity signal SA and the phase B eccentricity signal SB.

In step S120, the signal processor 130 causes the angle calculator 143 to calculate the electrical angle θ from the phase A eccentricity signal SA and the phase B eccentricity signal SB acquired in step S110 in accordance with arctan arithmetic or the like.

In step S130, the signal processor 130 causes the eccentricity value calculator 144 to calculate the eccentricity value e from the electrical angle θ calculated in step S120 and the pitch P2 in the radial direction of the slit track SI1 in accordance with (equation 2).

The signal processor 130 executes step S110 to step S130 repetitively at appropriate time intervals corresponding to processing speed or the like, and causes an appropriate recorder to record the plurality of eccentricity values e in association with the positional data θ (0 degrees to 360 degrees) during single rotation of the disc 110 generated by the positional data generator 135.

In step S140, the signal processor 130 causes the eccentricity measurement unit 136 to determine whether or not variation between the eccentricity value e calculated in step S130 and the eccentricity value e calculated immediately previously is more than a threshold TH2. The threshold TH2 is set to a value enabling determination of a shift to the slit track SI1 right next thereto in a case where the variation exceeds the threshold TH2. The flow proceeds to step S160 to be described later in a case where the variation in eccentricity value is equal to or less than the threshold TH2 (NO in step S140). The flow proceeds to step S150 in another case where the variation in eccentricity value is more than the threshold TH2 (YES in step S140).

In step S150, the signal processor 130 causes the eccentricity measurement unit 136 to execute slit cross processing. Specifically, an integer count value n (having an initial value equal to zero) is increased each time the slit cross processing is executed, and the eccentricity value e calculated in step S130 is corrected in accordance with (equation 8) replacing (equation 2).

$$e = (\theta/360° + n) \times P2 \quad \text{(Equation 8)}$$

In step S160, the signal processor 130 causes the eccentricity measurement unit 136 to determine whether the disc 110 has rotated once (rotation by 360 degrees in terms of a mechanical angle). This determination is made in accordance with the low incremental signals from the light receiving arrays PIL1 and PIL2 or the like. The determination may alternatively be made in accordance with the high incremental signals from the light receiving array PIH. The flow returns to step S110 in a case where the disc 110 has not rotated once (NO in step S160). The flow proceeds to step S170 in another case where the disc 110 has rotated once (YES in step S160).

In step S170, the signal processor 130 causes the eccentricity converter 145 to specify the maximum value e max and the minimum value e min from the eccentricity values e during single rotation of the disc 110.

In step S180, the signal processor 130 causes the eccentricity converter 145 to calculate eccentricity E from difference between the maximum value e max and the minimum value e min specified in step S170 (Equation 3). The present subroutine is then completed.

Figure 13:
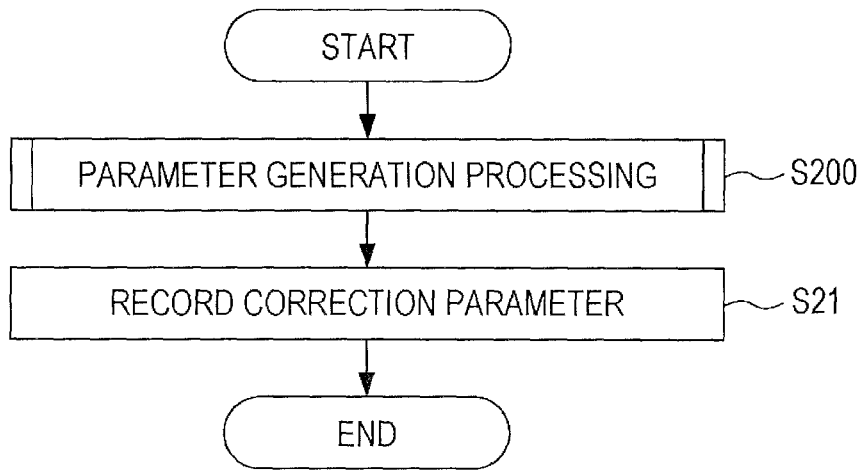
FIG. 13 is a flowchart depicting an exemplary procedure for correction parameter recording executed by the signal processor.

FIG. 13 is a flowchart depicting an exemplary procedure for correction parameter recording. This flow may be executed upon factory shipment of the encoder 100 (the servomotor SM). The encoder can thus internally hold the correction parameter Prm corresponding to eccentricity between the disc center O of the disc 110 and the rotation axial center AX of the shaft SH due to an error, a tolerance, or the like relevant to manufacturing of the encoder 100 (the servomotor SM). This flow may be executed not upon factory shipment but at timing appropriately specified by the user such as upon maintenance after the servo system S operates, or at constant intervals (the intervals can be appropriately specified by the user). This flow is executed in the state where a burden is applied to the shaft SH, so that the encoder can internally hold the eccentricity between the disc 110 and the shaft SH upon factory shipment, as well as the correction parameter Prm corresponding to misregistration of the rotation axial center AX of the shaft SH due to a burden, aged deterioration, or the like.

Figure 15:
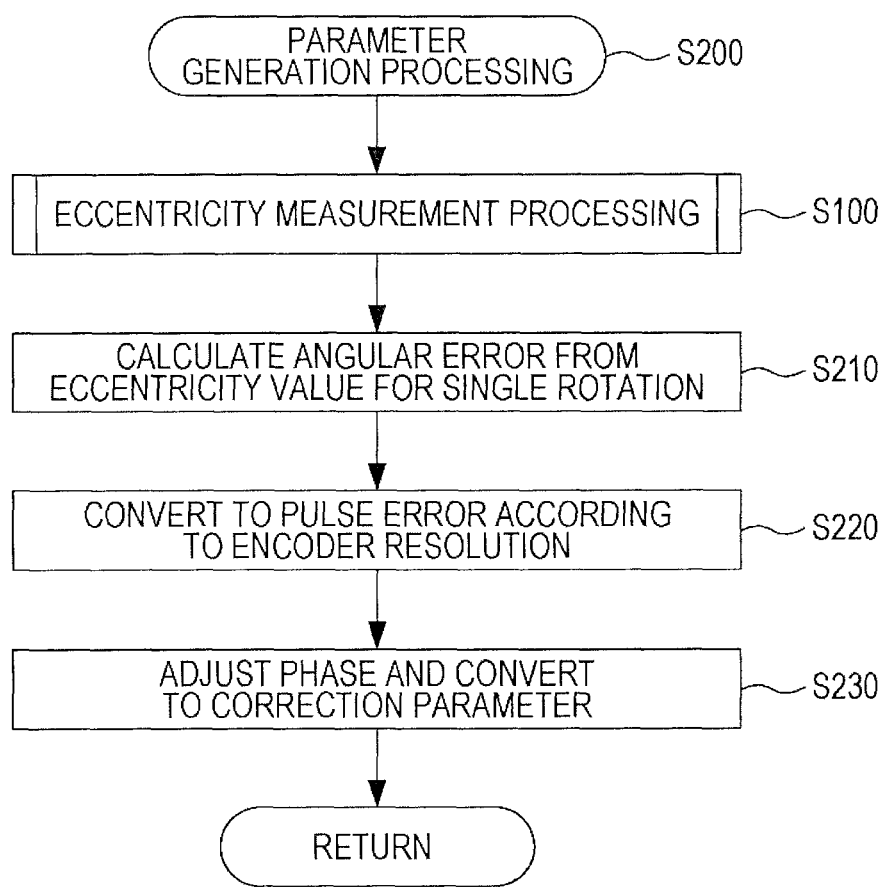
FIG. 15 is a flowchart depicting details of parameter generation processing.

In step S200, the signal processor 130 causes the parameter generator 139 to execute processing (parameter generation processing) of generating the correction parameter Prm for correction of a positional data error caused by the disc 110 being eccentric, in accordance with the eccentricity value e measured by the eccentricity measurement unit 136. The parameter generation processing will be described in detail later (FIG. 15).

In step S21, the signal processor 130 causes the parameter recorder 140 to record the correction parameter Prm generated in step S200. The present flow is then completed.

Figure 14:
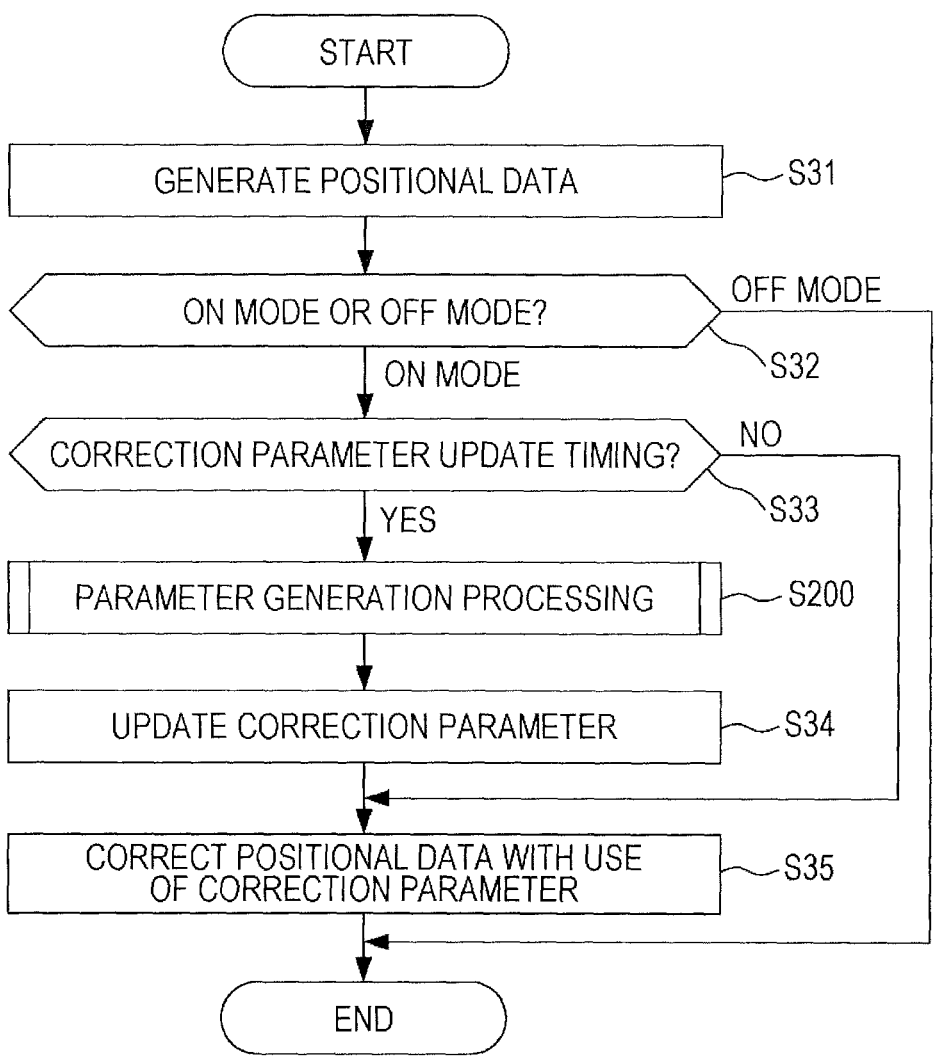
FIG. 14 is a flowchart depicting an exemplary procedure for correction parameter updating and positional data error correction executed by the signal processor.

FIG. 14 is a flowchart depicting an exemplary procedure for correction parameter updating and positional data correction. This flow is executed at constant timing (e.g. every several microseconds) while the servo system S is in operation.

In step S31, the signal processor 130 causes the positional data generator 135 or the like to generate positional data.

In step S32, the signal processor 130 determines whether the "ON mode" for execution of the processing including measuring the eccentricity and correcting the positional data or the "OFF mode" for no execution is selected. The present flow is completed in a case where the "OFF mode" is selected. The flow proceeds to step S33 in another case where the "ON mode" is selected.

In step S33, the signal processor 130 causes the parameter updater 141 to determine whether or not timing to update the correction parameter is applicable. As described earlier, examples of the update timing include timing appropriately specified by the user such as upon maintenance, at constant intervals (the intervals can be appropriately specified by the user), and constant timing (e.g. every several seconds). Alternatively, the eccentricity E or the eccentricity value e measured by the eccentricity measurement unit 136 at appropriate timing after the servo system S operates may be compared with the eccentricity E or the eccentricity value e in the past (e.g. upon factory shipment) recorded in the eccentricity recorder 137, and the predetermined update timing may be set when difference therebetween becomes larger than a predetermined threshold. The flow proceeds to step S34 to be described later in a case where the update timing is not applicable (NO in step S33). The flow proceeds to step S200 in another case where the update timing is applicable (YES in step S33).

In step S200, the signal processor 130 causes the parameter generator 139 to execute processing (parameter generation processing) of generating the correction parameter Prm for correction of a positional data error caused by the disc 110 being eccentric, in accordance with the eccentricity value e measured by the eccentricity measurement unit 136. The parameter generation processing will be described in detail later (FIG. 15).

In step S34, the signal processor 130 causes the parameter updater 141 to update the correction parameter Prm recorded in the parameter recorder 140 to the correction parameter Prm newly generated in step S200.

In step S35, the signal processor 130 causes the positional data corrector 142 to correct the positional data generated in step S31 in accordance with the correction parameter Prm recorded in the parameter recorder 140. The present flow is then completed.

FIG. 15 is a flowchart depicting details of the parameter generation processing in step S200.

In step S100, the signal processor 130 executes the eccentricity measurement processing depicted in FIG. 12.

In step S210, the signal processor 130 causes the error calculator 146 in the parameter generator 139 to acquire the eccentricity value e for single rotation of the disc 110 measured in step S100, and calculate the angular error dθ for single rotation of the disc 110 from the radius Rd of the disc 110 in accordance with (equation 4).

In step S220, the signal processor 130 causes the pulse converter 147 in the parameter generator 139 to convert the angular error dθ calculated in step S210 to the pulse error dP for single rotation of the disc 110 corresponding to the resolution of the encoder in accordance with (equation 5).

In step S230, the signal processor 130 causes the phase adjuster 148 in the parameter generator 139 to adjust the phase of the pulse error dP calculated in step S220 in accordance with (equation 6) and (equation 7), and convert to the correction parameter Prm for single rotation of the disc 110. The present subroutine is then completed.

3. Exemplary Effects of the Present Embodiment

According to the embodiment described above, the encoder 100 includes the disc 110 having the circular plate shape, and the optical module 120 positioned to oppose the disc 110. The disc 110 includes the slit track SI1 having the plurality of reflection slits si1 aligned to have the first repetition pattern in the circumferential direction C and the second repetition pattern in the radial direction R. The optical module 120 includes the light receiving arrays PIL1 and PIL2 configured to output the low incremental signals correspondingly to a shift in the circumferential direction C of the slit track SI1, and the light receiving array PE configured to output the eccentricity signals correspondingly to a shift in the radial direction R of the slit track SI1.

This configuration enables measurement of both the shift amount (rotation amount) in the circumferential direction of the disc 110 and the shift amount (eccentricity) in the radial direction thereof, according to the low incremental signals and the eccentricity signals. This achieves internal measurement of the rotation amount as well as the eccentricity in the encoder 100, without need for any external sensor configured to measure the eccentricity. Furthermore, the slit track SI1 has the repetition patterns both in the circumferential direction and the radial direction, to enable measurement of both the rotation amount and the eccentricity with use of the common slit track SI1. There is accordingly no need to provide, as a separate track, any pattern (e.g. a concentric circular pattern) for measurement of the eccentricity in addition to the slit track for measurement of the rotation amount (the light receiving arrays PIL1 and the PIL2 and the light receiving array PE need not be aligned in the radial direction on the optical module 120), for inhibition of increase in size of the encoder 100.

Particularly in the present embodiment, the slit track Si1 is provided to have the first repetition pattern with the pitch P1 gradually increased toward the outer position in the radial direction R.

The pitch P1 is changed in length in accordance with difference between circumferential lengths at a radially inner end and a radially outer end of the slit track SI1 in the disc 110 having the circular plate shape, so that the repetition pattern in the circumferential direction C can be made constant regardless of positions in the radial direction. This enables accurate measurement of the rotation amount even when eccentricity occurs.

Particularly in the present embodiment, the slit track SI1 includes the reflection slits si1 that are line symmetric in the circumferential direction C as well as are line symmetric in the radial direction R.

Each of the low incremental signals and the eccentricity signals can thus have a waveform uniformly increased and decreased in amplitude, which leads to simplified signal processing. Furthermore, the reflection slits si1 can be simplified in shape for facilitated formation of the reflection slits si1.

Particularly in the present embodiment, the slit track SI1 includes the reflection slits si1 that have the width wr in the radial direction R increased and decreased in the circumferential direction C.

This configuration achieves the slit track SI1 having the repetition pattern extending in the circumferential direction C. The shift amount (rotation amount) in the circumferential direction of the disc 110 can thus be measured with use of the slit track SI1.

Particularly in the present embodiment, the slit track SI1 includes the reflection slits si1 that have the width we in the circumferential direction C increased and decreased in the radial direction R.

This configuration achieves the slit track SI1 having the repetition pattern extending in the radial direction R. The shift amount (eccentricity) in the radial direction of the disc 110 can thus be measured with use of the slit track SI1.

Particularly in the present embodiment, the slit track SI1 is provided to have the first repetition pattern with the pitch P1 longer than the pitch P2 of the second repetition pattern. This configuration achieves the following effect.

The eccentricity (eccentricity between the disc center O and the rotation axial center AX of the shaft SH due to an error, a tolerance, or the like relevant to manufacturing, or eccentricity caused by misregistration of the rotation axial center AX due to aged deterioration, a burden, or the like) of the disc 110 is typically smaller than the rotation amount of the disc 110 during equal time. The pitch P1 in the circumferential direction is longer than the pitch P2 in the radial direction (in other words, the pitch P2 in the radial direction is shorter than the pitch P1 in the circumferential direction) in the repetition pattern of the slit track SI1 according to the present embodiment, so that resolution enabling measurement of the eccentricity can be made larger than the resolution enabling measurement of the rotation amount. This leads to accurate measurement of the eccentricity.

Particularly in the present embodiment, the slit track SI1 includes the reflection slits si1 that are shaped by compressing in the radial direction R the right-angle rotationally symmetric shape.

The low incremental signals and the eccentricity signals can thus have substantially same waveforms, which leads to simplified signal processing. Furthermore, the reflection slits si1 can be simplified in shape for facilitated formation of the reflection slits si1.

Particularly in the present embodiment, the slit track SI1 includes the reflection slits si1 that have the substantially rhomboid shape.

The low incremental signals and the eccentricity signals can thus have the substantially same waveforms and be substantially constant in degree of change (linear change) in amplitude of the signals, which leads to simplified waveforms and simplified signal processing. Furthermore, the slits can be simplified in shape to facilitate formation of the slits.

Particularly in the present embodiment, the light receiving arrays PIL1 and PIL2 each include the plurality of light receiving elements p5 aligned in the circumferential direction C and configured to receive light emitted from the light source 121 and reflected at the slit track SI1 and to output the low incremental signals, and the light receiving array PE includes the plurality of light receiving elements p7 aligned in the radial direction R and configured to receive light emitted from the light source 121 and reflected at the slit track Si1 and to output the eccentricity signals.

This configuration achieves accurate measurement of the shift amount (rotation amount) in the circumferential direction C of the disc 110 with use of the light receiving arrays PIL1 and PIL2, as well as accurate measurement of the shift amount (eccentricity) in the radial direction R of the disc 110 with use of the light receiving array PE.

Particularly in the present embodiment, the light receiving arrays PIL1 and PIL2 and the light receiving array PE are aligned in the circumferential direction C.

This configuration achieves measurement of both the rotation amount and the eccentricity with use of the slit track SI1 configured as a single track. This leads to reduction in size of the optical module 120 and the disc 110 in comparison to an exemplary configuration including the light receiving arrays PIL1 and PIL2 and the light receiving array PE positioned to be offset in the radial direction R (in this case, the disc 110 is to be provided, as a separate track, a pattern for measurement of the eccentricity (e.g. a concentric circular pattern) separately from the slit track SD for measurement of the rotation amount).

Particularly in the present embodiment, the light receiving arrays PIL1 and PIL2 are positioned separately into two parts in the circumferential direction C, and the light receiving array PE is positioned between the two light receiving arrays PIL1 and PIL2.

This configuration enables provision of the light receiving array PE adjacent to the light source 121 and increase in light receiving quantity of the light receiving array PE, for improvement in measurement accuracy of the eccentricity.

Particularly in the present embodiment, the light receiving arrays PIL1 and PIL2 and the light receiving array PE are each symmetric in the circumferential direction C with respect to, as the symmetry axis, the line Lr passing the optical axis Op of the light source 121 and extending in the radial direction R. This configuration achieves the following effect.

Light reflected at the surface of the optical module 120 has intensity distribution decreased concentrically around the optical axis Op. The light receiving arrays PIL1 and PIL2 and the light receiving array PE are each symmetric in the circumferential direction C with respect to, as the symmetry axis, the line Lr passing the optical axis Op and extending in the radial direction R, to eliminate imbalance in the circumferential direction of light receiving quantity at each of the light receivers and improve measurement accuracy.

Particularly in the present embodiment, the slit track SI1 includes the plurality of reflection slits si1 aligned to have the first repetition pattern in the circumferential direction C, and the light receiving arrays PIL1 and PIL2 are configured to receive light emitted from the light source 121 and reflected at the slit track SI1 and to output the low incremental signals.

The encoder 100 can thus be configured to measure the shift amount (rotation amount) in the circumferential direction of the disc as well as the shift amount (eccentricity) in the radial direction thereof with use of the slit track SI1 for the incremental signals.

Particularly in the present embodiment, the disc 110 includes the slit track SI2 having the plurality of reflection slits si2 aligned to have the incremental pattern shorter in pitch than the first repetition pattern in the circumferential direction C, and the optical module 120 includes the light receiving array PIH configured to receive light emitted from the light source 121 and reflected at the slit track SI2 and to output the high incremental signals.

The eccentricity is thus measured not with use of the slit track SI2 determining the resolution of the encoder 100 but with use of the slit track SI1 longer in pitch thereof. The encoder 100 can thus have high resolution enabling internal measurement of the eccentricity. A configuration for measurement of the eccentricity with use of the slit track SI2 for generation of the high incremental signals will lead to deterioration in signal strength and multiplication accuracy. The configuration for measurement of the eccentricity with use of the slit track SI1 for generation of the low incremental signals leads to maintained or improved multiplication accuracy as well as acquisition of highly accurate eccentricity.

Particularly in the present embodiment, the disc 110 includes the slit track SA1 having the plurality of reflection slits sa1 aligned to have the first absolute pattern in the circumferential direction C, and the slit track SA2 having the plurality of reflection slits sa2 aligned to have the second absolute pattern in the circumferential direction C. The optical module 120 includes the light receiving array PA1 having the plurality of first absolute light receiving elements p1 configured to receive light emitted from the light source 121 and reflected at the slit track SA1 and to output the first absolute signals having the first phase, and the plurality of second absolute light receiving elements p2 configured to output the first absolute signals having the second phase with the predetermined phase difference from the first phase, the first absolute light receiving elements p1 and the second absolute light receiving elements p2 being positioned alternately in the circumferential direction C, and the light receiving array PA2 having the plurality of third absolute light receiving elements p3 configured to receive light emitted from the light source 121 and reflected at the slit track SA2 and to output the second absolute signals hating the first phase, and the plurality of fourth absolute light receiving elements p4 configured to output the second absolute signals having the second phase, the third absolute light receiving elements p3 and the fourth absolute light receiving elements p4 being positioned alternately in the circumferential direction C.

This configuration accordingly achieves measurement of the eccentricity not with use of the slit tracks SA1 and SA2 for measurement of the absolute position, but with use of the slit track SI1 having the incremental pattern for measurement of the relative position. This enables the absolute position encoder 100 configured to accurately measure eccentricity.

Particularly in the present embodiment, the encoder 100 further includes the signal processor 130 configured to execute predetermined signal processing in accordance with at least either the low incremental signals or the eccentricity signals. The signal processor 130 includes the eccentricity measurement unit 136 configured to measure the eccentricity E as the shift amount in the radial direction R during single rotation of the disc 110 in accordance with the eccentricity signals.

The encoder 100 can thus be configured to internally measure the eccentricity with use of the eccentricity signals. The encoder 100 can further internally execute various processing with use of the measured eccentricity (e.g. abnormality detection, malfunction prediction, issue of warning or an alarm, generation of a correction parameter, and positional data error correction).

Particularly in the present embodiment, the signal processor 130 includes the eccentricity recorder 137 configured to record the eccentricity E measured by the eccentricity measurement unit 136, and the abnormality determiner 138 configured to compare the eccentricity E measured by the eccentricity measurement unit 136 and the eccentricity E0 recorded in the eccentricity recorder 137 and determine whether or not there is abnormality relevant to eccentricity.

This configuration achieves prompt measurement of change in eccentricity through comparison between past eccentricity (upon factory shipment or the like) and current eccentricity. This enables determination of abnormality (e.g. application of an abnormally large burden or load) of the encoder 100 in accordance with the variation, malfunction prediction (e.g. aged deterioration of any component such as the bearing) of the motor M or the encoder 100, and execution of processing such as issue of warning or an alarm, or emergency stop through transmission of results thereof to the controller CT.

Particularly in the present embodiment, the signal processor 130 includes the positional data generator 135 configured to generate positional data in accordance with the low incremental signals, the parameter generator 139 configured to generate the correction parameter Prm for correction of a positional data error caused by the disc 110 being eccentric in accordance with the eccentricity value e measured by the eccentricity measurement unit 136, and the positional data corrector 142 configured to correct the positional data in accordance with the correction parameter Prm.

This configuration achieves substantially prompt correction of any positional data error caused by eccentricity of the disc 110 while the encoder 100 is in operation. The encoder 100 can thus achieve improvement in rotational position measurement accuracy.

Particularly in the present embodiment, the signal processor 130 includes the parameter recorder 140 configured to record the correction parameter Prm generated by the parameter generator 139, and the parameter updater 141 configured to update the correction parameter Prm recorded in the parameter recorder 140 at predetermined timing. This configuration achieves the following effect.

The eccentricity of the disc 110 may be changed as time passes in accordance with time of use, operating environment, or the like, due to deteriorated fixation (adhesion) between the shaft SH and the disc 110, aged deterioration of any component (e.g. the bearing supporting the shaft SH) in the motor M or the encoder 100, misregistration of the rotation axial center AX caused by bending or the like of the shaft SH due to a burden or a load applied to the shaft SH, or the like. The correction parameter Prm is thus also preferred to be updated where appropriate. The present embodiment allows the correction parameter Prm to be updated to a latest correction parameter Prm at predetermined timing. The correction parameter Prm is updated in an exemplary state where a burden or a load is applied to the shaft SH after the servo system S operates, so that the encoder can internally hold the correction parameter Prm corresponding to the change in eccentricity and achieves correction of the positional data correspondingly to the change in eccentricity. Particularly in the case where the update timing is set at constant intervals (e.g. every several seconds), the correction parameter Prm can be updated substantially promptly. This leads to further improvement in measurement accuracy of the rotational position of the disc 110.

4. Modification Examples

The embodiment thus disclosed should not be limited by the above description, and can be modified in various manners within a range not departing from the spirit and the technical idea thereof. Modification examples thus achieved will be described below.

4-1. When Light Receiving Arrays Configured to Measure Rotation Amount and Light Receiving Array Configured to Measure Eccentricity are Aligned in Radial Direction The above embodiment exemplifies the case where the light receiving arrays PIL1 and PIL2 for measurement of the shift amount (rotation amount) in the circumferential direction C of the disc 110 and the light receiving array PE for measurement of the shift amount (eccentricity) in the radial direction R of the disc 110 are aligned in the circumferential direction C. However, the light receiving arrays should not be limited to this case in terms of the layout thereof. For example, the light receiving arrays for measurement of the shift amount (rotation amount) in the circumferential direction C of the disc 110 and the light receiving array for measurement of the shift amount (eccentricity) in the radial direction R of the disc 110 may alternatively aligned in the radial direction R.

Figure 16:
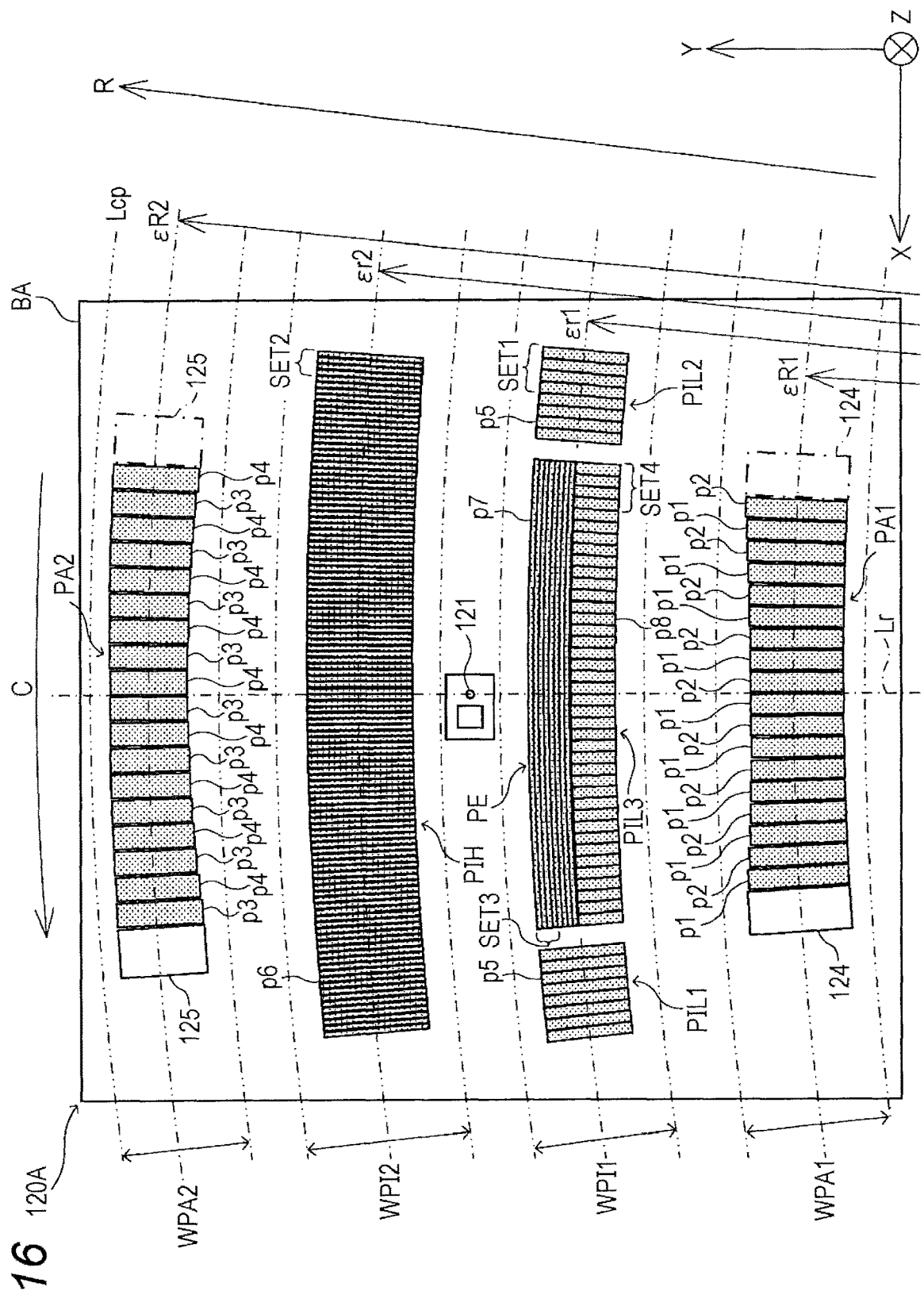
FIG. 16 is a bottom view depicting exemplary layout configurations of a light source and light receiving arrays included in an optical module according to a modification example, in which light receiving arrays configured to measure a rotation amount and a light receiving array configured to measure eccentricity are aligned in a radial direction.

FIG. 16 depicts an exemplary layout configuration of light receiving arrays included in an optical module 120A according to the present modification example. FIG. 16 includes identical reference signs denoting configurations similar to those depicted in FIG. 5 referred to earlier.

As depicted in FIG. 16, the optical module 120A includes, as light receiving arrays configured to receive light reflected at the slit track Sl1 and generate low incremental signals, three light receiving arrays PIL1, PIL2, and PIL3 separately positioned in the circumferential direction C. The light receiving array PIL3 is positioned between the two light receiving arrays PIL1 and PIL2. The light receiving array PE configured to receive light reflected at the slit track SI1 and generate the eccentricity signals is positioned adjacent to the light receiving array PIL3 in the radial direction R. According to this example, the light receiving array PE is positioned adjacent to the outer circumference whereas the light receiving array PIL3 is positioned adjacent to the inner circumference. The light receiving array PE and the light receiving array PIL3 are substantially equal in length in the circumferential direction C and length in the radial direction R. These dimensions may alternatively be differentiated. The light receiving arrays PE and PIL3 are each symmetric in the circumferential direction C with respect to, as the symmetry axis, the line Lr passing the optical axis Op of the light source 121 and extending in the radial direction. The light receiving array PIL1 and the light receiving array PIL2 are shaped to be symmetric in the circumferential direction C with respect to the line Lr as the symmetry axis.

The light receiving array PIL3 includes a plurality of light receiving elements p8 (exemplifying the first light receiving elements) aligned in the circumferential direction C to respectively receive light reflected by the reflection slits si1 in the slit track SI1. The light receiving elements p8 have a length in the radial direction R substantially a half of the length in the radial direction R of the light receiving elements p5. Similarly to the light receiving elements p5, a set (denoted by "SET4" in FIG. 16) of totally four light receiving elements p8 are aligned in one pitch ($\varepsilon \times P1$) of the incremental pattern in the circumferential direction of the slit track SI1, and a plurality of sets of the four light receiving elements p8 is further aligned in the circumferential direction C. The number of sets of the light receiving arrays PIL1 and PIL2 (the number of "SET1") is smaller than that according to the above embodiment (FIG. 5) due to a layout thereof.

The light receiving elements p7 included in the light receiving array PE are longer in length in the circumferential direction C than the light receiving elements p7 according to the above embodiment (FIG. 5), whereas the number of sets of the four light receiving elements p7 (the number of "SET3") is smaller than that according to the above embodiment (FIG. 5) due to a layout thereof.

The three light receiving arrays PIL1, PIL2, and PIL3 may not be separated but may be arranged continuously in the circumferential direction CL. Alternatively, the light receiving array PE may be positioned adjacent to the inner circumference whereas the light receiving array PIL3 may be positioned adjacent to the outer circumference. Configurations other than the above, which are similar to those according to the above embodiment, will not be described repeatedly.

The light receiving arrays PIL1 and PIL2 may be configured as light receiving elements for light quantity adjustment. In this case, the light receiving signals outputted from the light receiving arrays are added to generate a light quantity adjustment signal having substantially constant amplitude, and quantity of light emitted from the light source 121 is adjusted in accordance with the light quantity adjustment signal.

The present modification example is effective similarly to the above embodiment. Furthermore, the disc 110 has eccentricity having a relatively small value as described earlier. When the light receiving array PE is decreased in dimension in the radial direction R within a range not affecting eccentricity measurement and the light receiving array PIL3 for measurement of the shift amount (rotation amount) in the circumferential direction C of the disc 110 is positioned adjacent to the light source 121, the light receiving array PIL3 can be increased in light receiving quantity to improve accuracy in measurement of the rotation amount.

4-2. Various Slit Shapes

The above embodiment exemplifies the case where the reflection slits si1 in the slit track SI1 have the substantially rhomboid shape. The reflection slits si1 should not be limited to the rhomboid shape and can be shaped variously.

Figure 17:
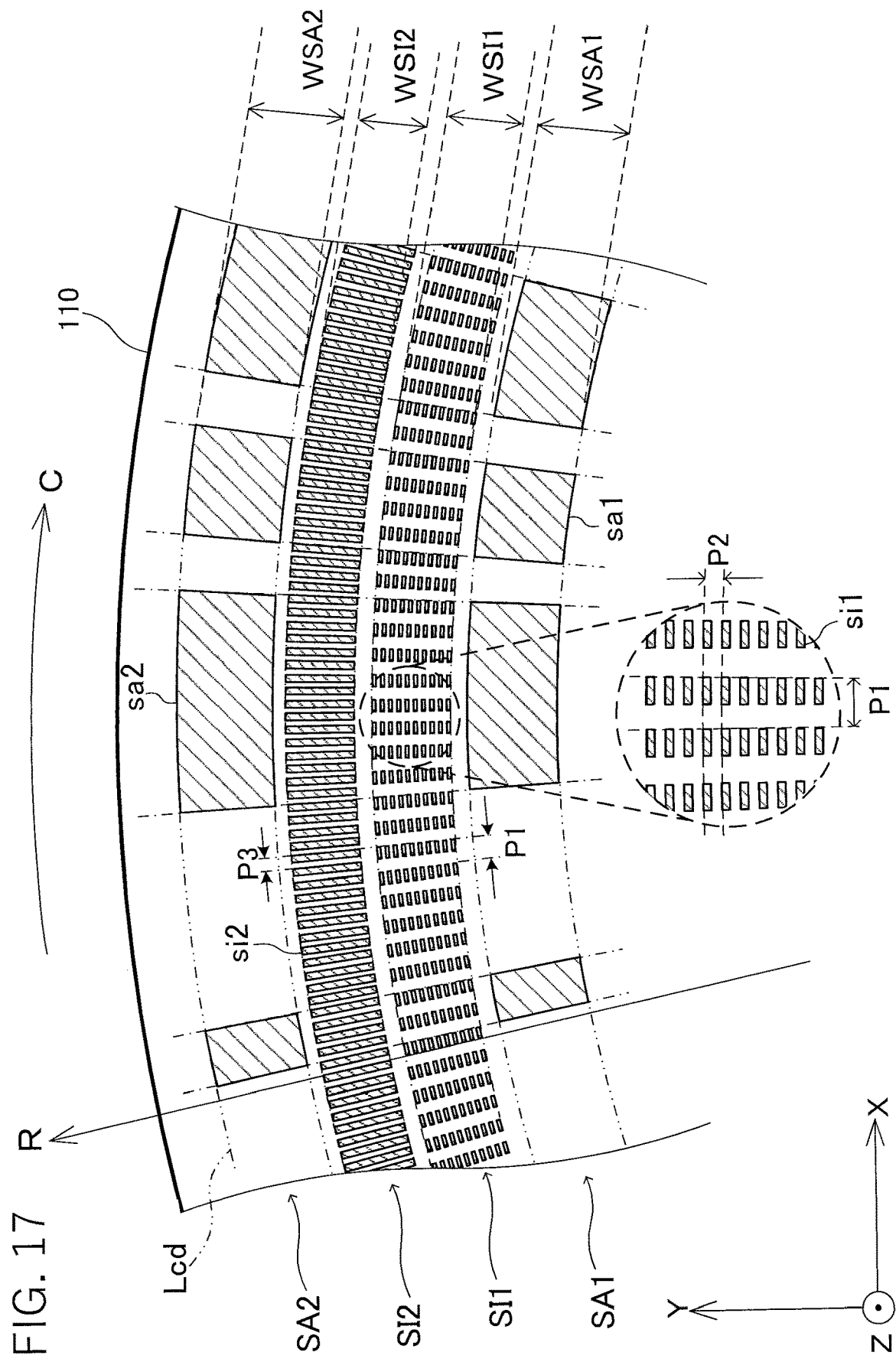
FIG. 17 is an enlarged partial view of a top surface of a disc, depicting exemplary configurations of slit tracks including reflection slits each having a rectangular shape according to a modification example.

As exemplarily depicted in FIG. 17, the reflection slits si1 in the slit track SI1 may have a substantially rectangular shape. FIG. 17 includes identical reference signs denoting configurations similar to those depicted in FIG. 4 referred to earlier. The plurality of reflection slits si1 is aligned on the entire circumference of the disc 110 to have the first repetition pattern in the circumferential direction C and the second repetition pattern in the radial direction R. The slit track SI1 is provided to have the first repetition pattern with the pitch P1 longer than the pitch P2 of the second repetition pattern. The slit track SI1 is provided to have the first repetition pattern with the pitch P1 gradually increased toward an outer position in the radial direction.

The reflection slits si1 in the slit track SI1 are shaped to be substantially line symmetric in the circumferential direction C with respect to, as the symmetry axis, the axis in the radial direction R at the center position in the circumferential direction, as well as to be substantially line symmetric in the radial direction R with respect to, as the symmetry axis, the axis in the circumferential direction C at the center position in the radial direction. The reflection slits sit are shaped by compressing in the radial direction R the right-angle rotationally symmetric shape that is substantially identically shaped before and after right-angle rotation (e.g. a square shape), specifically a substantially rectangular shape.

Configurations other than the slit track SI1, which are similar to those according to the above embodiment, will not be described repeatedly.

The present modification example is effective similarly to the above embodiment. There is no pointed portion having any acute angle in comparison to a shape such as the rhomboid shape. This configuration facilitates formation of the slits and improves accuracy in shape of the slits.

FIG. 18 to FIG. 21 each depict a different varied shape of each of the reflection slits si1 in the slit track SI1. FIG. 18 to FIG. 21 each depict an extracted one of the reflection slits si1.

The reflection slit si1 depicted in each of FIG. 18 to FIG. 21 has the following common characteristics. The reflection slit si1 is shaped to have the width wr in the radial direction R increased and decreased in the circumferential direction C, and the width we in the circumferential direction C increased and decreased in the radial direction R. The reflection slits si1 are shaped to be substantially line symmetric in the circumferential direction C with respect to, as the symmetry axis, the axis in the radial direction R at a position with the maximum width wr, as well as to be substantially line symmetric in the radial direction R with respect to, as the symmetry axis, an axis in the circumferential direction C at a position with the maximum width we.

Figure 18:
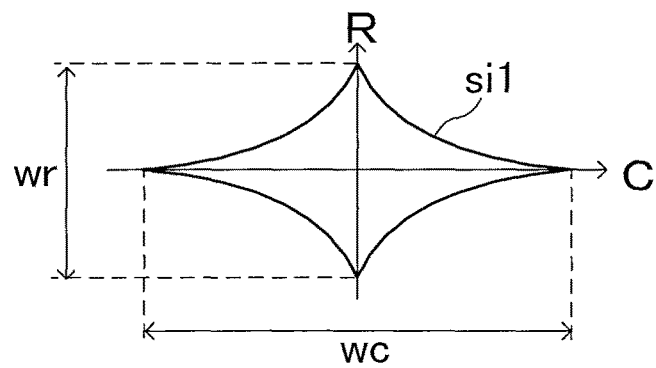
FIG. 18 is an explanatory view depicting a first varied shape of each of the reflection slits.
Figure 19:
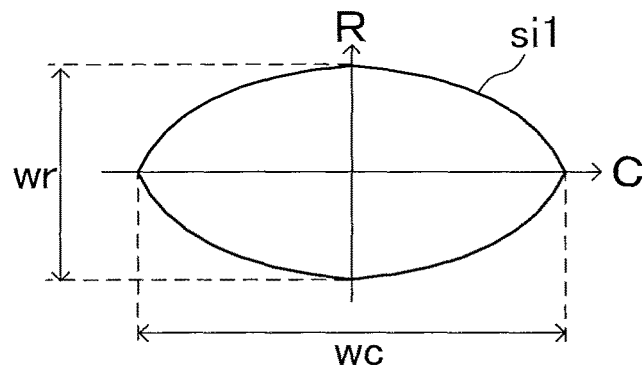
FIG. 19 is an explanatory view depicting a second varied shape of each of the reflection slits.
Figure 20:
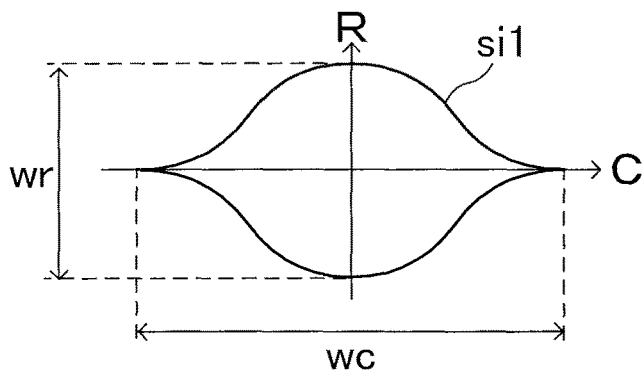
FIG. 20 is an explanatory view depicting a third varied shape of each of the reflection slits.
Figure 21:
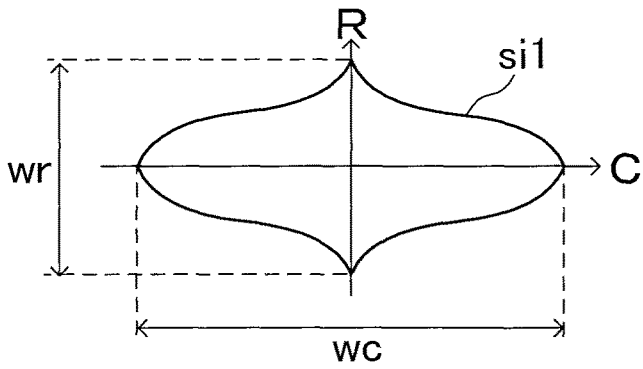
FIG. 21 is an explanatory view depicting a fourth varied shape of each of the reflection slits.

The reflection slit si1 depicted in each of FIG. 18 to FIG. 21 also has the following unique characteristics. The reflection slit si1 depicted in FIG. 18 is shaped to have change in the circumferential direction C of the radial width wr, the change being moderate adjacent to a circumferential end and becoming steeper toward a circumferential center position. In contrast, the reflection slit si1 depicted in FIG. 19 is shaped to have change in the circumferential direction C of the radial width wr, the change being steep adjacent to a circumferential end and becoming more moderate toward a circumferential center position. The reflection slit si1 depicted in FIG. 20 is shaped to have change in the circumferential direction C of the radial width wr, the change being moderate adjacent to a circumferential end, becoming steep at an intermediate point between the circumferential end and a circumferential center position, and becoming moderate again adjacent to the circumferential center position. In contrast, the reflection slit si1 depicted in FIG. 21 is shaped to have change in the circumferential direction C of the radial width wr, the change being steep adjacent to a circumferential end, becoming moderate at an intermediate point between the circumferential end and a circumferential center position, and becoming steep again adjacent to the circumferential center position.

The reflection slits si1 in the slit track SI1 may be shaped appropriately to achieve a desired waveform of the light receiving signals in accordance with the characteristics of each of the shapes.

4-3. When Optical Module is Provided in Shaft Radial Loading Direction

The shaft SH of the motor M may receive a load in the radial direction from a driving target (e.g. a gear or a pulley) rotary driven by the motor M. Such a load may slightly bend the shaft SH to cause misregistration (displacement) of the rotation axial center AX of the shaft SH The optical module 120 may thus be positioned and directed correspondingly to the direction of the load.

Figure 22:
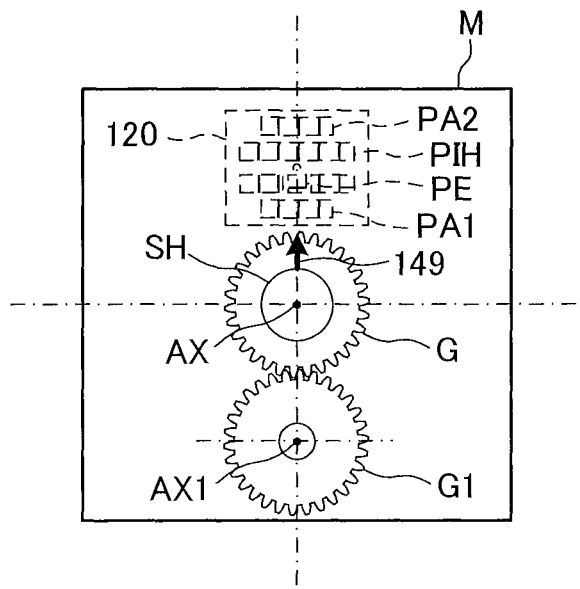
FIG. 22 is an explanatory view from a rotary power output end of a shaft, of a motor according to a modification example in which an optical module is positioned in a radial loading direction of the shaft.
Figure 23:
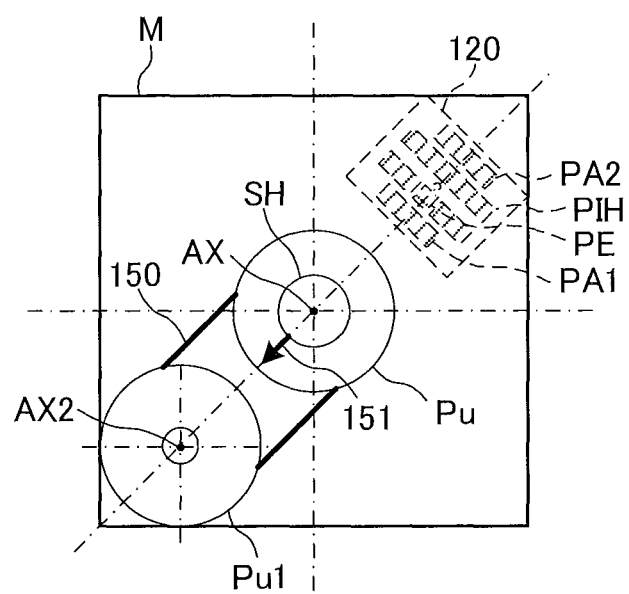
FIG. 23 is an explanatory view from a rotary power output end of a shaft, of a motor according to another modification example in which an optical module is positioned in a radial loading direction of the shaft.

FIG. 22 and FIG. 23 are views of the motor M from the rotary power output end of the shaft SH. FIG. 22 and FIG. 23 each depict, with broken lines, only the optical module 120 in the encoder 100 positioned opposite to the rotary power output end.

FIG. 22 exemplifies an output gear G provided at a tip of the shaft SH and meshing with a gear G1 as a driving target rotary driven by the motor M. Examples of the gear G1 include a gear provided at an input shaft of a speed reducer. The shaft SH thus receives a load so as to be pushed in the radial direction indicated by arrow 149. The optical module 120 is provided such that an alignment direction of the plurality of light receiving elements p7 included in the light receiving array PE (e.g. a direction of the line Lr passing the optical axis Op of the light source 121 and extending in the radial direction) substantially matches a direction connecting the rotation axial center AX of the shaft SH in the motor M to be measured by the encoder 100 and a rotation axial center AX1 of the gear G1 rotary driven by the motor M.

FIG. 23 exemplifies a driving pulley Pu provided at the tip of the shaft SH and coupled to a driven pulley Pu1 as a driving target rotary driven by the motor M via a belt 150 (e.g. a chain). The shaft SH thus receives a load so as to be pulled in the radial direction indicated by arrow 151. The optical module 120 is provided such that the alignment direction of the plurality of light receiving elements p7 included in the light receiving array PE (e.g. the direction of the line Lr passing the optical axis Op of the light source 121 and extending in the radial direction) substantially matches a direction connecting the rotation axial center AX of the shaft SH in the motor M to be measured by the encoder 100 and a rotation axial center AX2 of the driven pulley Pu1 rotary driven by the motor M.

According to the present modification example, the shaft SH is bent by a load in a direction matching a direction of a target measured by the light receiving array PE in the optical module 120, for accurate measurement of eccentricity caused by the shaft SH being bent. A bent amount of the shaft SH by a radial load can be measured even in a state where the disc 110 is not rotated but is stopped. This enables execution of various processing (e.g. abnormality detection, malfunction prediction, issue of warning or an alarm, and positional data error correction) according to the bent amount thus measured.

4-3. Others

The above description relates to the configuration for measurement of the eccentricity with use of the slit track SD for generation of the low incremental signals. Alternatively, with the slit track SI2 for generation of the high incremental signals having repetition patterns in the circumferential direction and the radial direction, the eccentricity may be measured with use of the slit track SI2. When the positional data is corrected with use of the eccentricity, the positional data is corrected eventually with improved resolution by multiplication with use of the high incremental signals. Actually desired eccentricity is thus obtained at the portion for generation of the high incremental signals. The configuration for measurement of the eccentricity with use of the slit track SI2 can achieve accurate acquisition of the desired eccentricity. When the slit track SI2 is configured to have the repetition patterns both in the circumferential direction and the radial direction, the pitch P1 of the repetition pattern in the circumferential direction should not be necessarily longer than the pitch P2 of the repetition pattern in the radial direction, and the pitch P1 may be substantially equal to the pitch P2 or the pitch P2 may be longer than the pitch P1. The pitch P2 longer than the pitch P1 leads to increase in eccentricity detection range in one slit.

The above description relates to provision to the disc 110 of the two slit tracks SI1 and SI2 having the incremental patterns different in pitch. There may alternatively be provided three or more slit tracks having incremental patterns different in pitch. This configuration also achieves high resolution by means of stacking.

The above description relates to the case where the light receiving arrays PA1 and PA2 each have 18 light receiving elements and the phase A absolute signal and the phase B absolute signal each indicate the absolute position of nine bits. The number of the light receiving elements may not be 18, and the number of bits in the absolute signals is not limited to nine. The number of the light receiving elements in each of the light receiving arrays PI1 and P12 should not be particularly limited to the number according to the above embodiment.

The above description relates to the case where the encoder 100 is directly coupled to the motor M, but the encoder 100 may alternatively be coupled via another mechanism such as a speed reducer or a rotation direction changer.

The above embodiment exemplifies the case where a so-called reflection encoder including the light source and the light receiving arrays positioned on an identical side with respect to the slit tracks on the disc 110. The encoder should not be limited to this exemplification. Specifically, the encoder may alternatively be a transmissive encoder including the light source and the light receiving arrays opposed to interpose the disc 110. In this case, the disc 110 may include the slits in the slit tracks SA1, SA2, SI1, and S12 configured as transmissive slits (e.g. holes), or have a portion not provided with the slits and formed to have a rough surface by sputtering or the like or formed by applying a less transmissive material in the disc made of a light transmitting material such as glass or transparent resin. The light source 121 and the light receiving arrays PA1, PA2, PIL1, PIL2, PE, and PIH are opposed to interpose the disc 110 in the present modification example. The optical module 120 according to the present modification example includes the light source and the light receiving arrays provided separately in this manner. Such a transmissive encoder is effective similarly to the above embodiment.

Other than the above, techniques according to the above embodiment and the modification examples can be combined where appropriate. Though not exemplified individually, the embodiment and the modification examples may be implemented with various changes within a range not departing from the spirit.

5. Exemplary Hardware Configuration of Controller

The signal processor 130 will be described next in terms of its exemplary hardware configuration with reference to FIG. 24.

Figure 24:
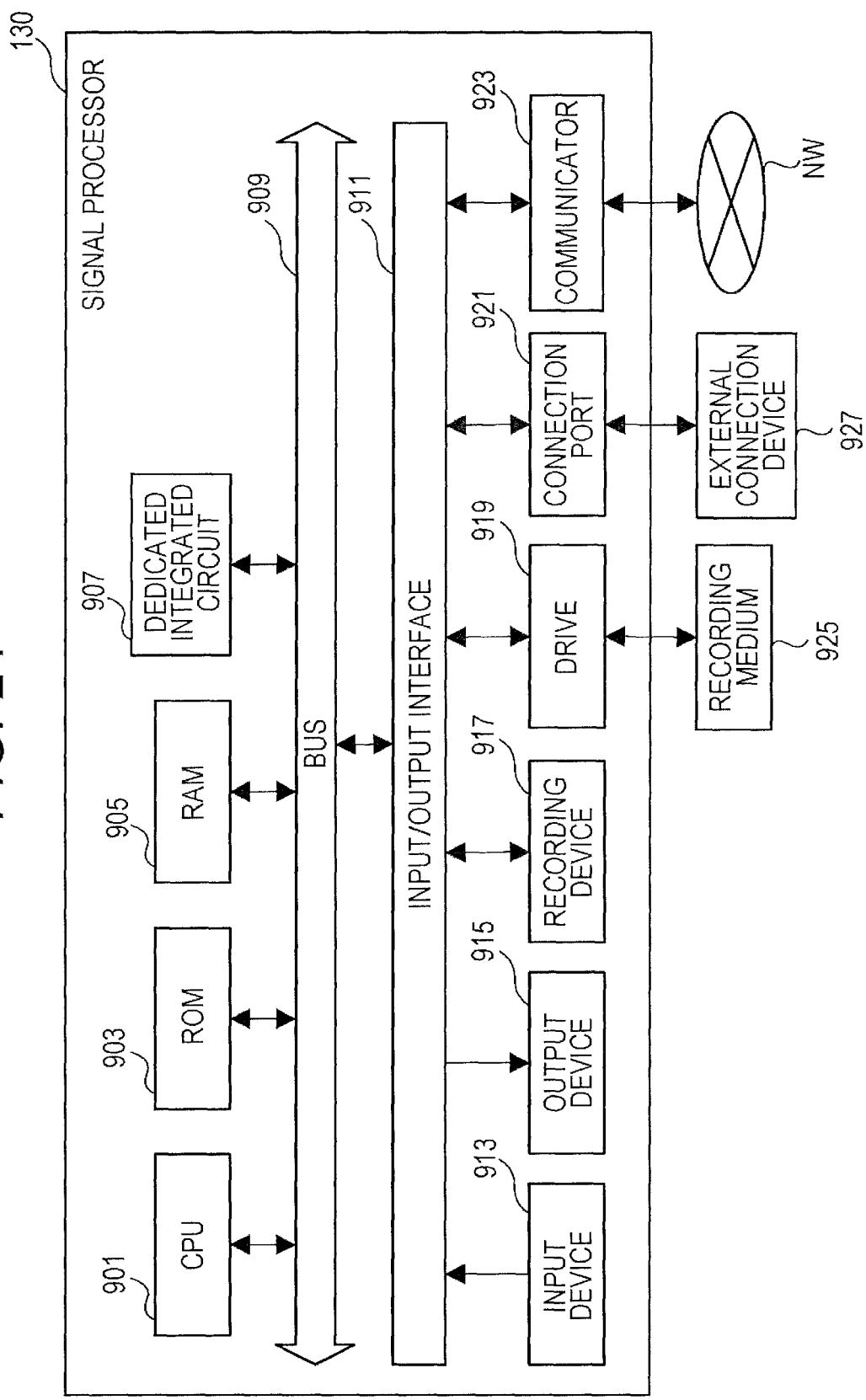
FIG. 24 is a block diagram depicting an exemplary hardware configuration of the signal processor.

As exemplarily depicted in FIG. 24, the signal processor 130 includes the CPU 901, a ROM 903, a RAM 905, a dedicated integrated circuit 907 such as an ASIC or an FPGA configured for specific application, an input device 913, an output device 915, a recording device 917, a drive 919, a connection port 921, and a communicator 923. These configurations are connected to each other via a bus 909 or an input/output interface 911 so as to achieve mutual signal transmission.

The programs can be recorded in the ROM 903, the RAM 905, the recording device 917, or the like.

The programs can alternatively be recorded temporarily or nontemporarily (permanently) in a removable recording medium 925 such as a magnetic disk like a flexible disk, an optical disk like any type of a CD, an MO disk, or a DVD, or a semiconductor memory. The recording medium 925 may be provided as so-called package software. In this case, the programs recorded in the recording medium 925 may be read by the drive 919 and recorded in the recording device 917 via the input/output interface 911, the bus 909, or the like.

The programs can be recorded in any download site, any other computer, any other recording device (not depicted), or the like. The programs are transferred via a network NW such as the LAN or the Internet, to be received by the communicator 923. The programs received by the communicator 923 may be recorded in the recording device 917 via the input/output interface 911, the bus 909, or the like.

The programs can be recorded in an appropriate external connection device 927. In this case, the programs may be transferred via the appropriate connection port 921 and may be recorded in the recording device 917 via the input/output interface 911, the bus 909, or the like.

The CPU 901 executes the various processing in accordance with the programs recorded in the recording device 917 to achieve the functions of the eccentricity measurement unit 136, the abnormality determiner 138, the parameter generator 139, the parameter updater 141, the positional data corrector 142, and the like. In this case, the CPU 901 may execute the processing by directly reading the programs out of the recording device 917, or may temporarily download the programs on the RAM 905 to execute the processing. Furthermore, in a case where the programs are received via the communicator 923, the drive 919, or the connection port 921, the CPU 901 may directly execute the received programs without recording in the recording device 917.

The CPU 901 may execute the various processing in accordance with a signal or information inputted with use of the input device 913 like a mouse, a keyboard, a microphone (not depicted), or the like.

The CPU 901 may output a result of the executed processing from the output device 915 like a display device or an audio output device, may transmit the processing result where necessary via the communicator 923 or the connection port 921, or may record the processing result in the recording device 917 or the recording medium 925.

What is claimed is:

1. An encoder comprising:
   a disc having a circular surface with a central axis and being rotatable around the central axis, the disc having a slit row provided on the circular surface, the slit row including slits arranged in a circumferential direction of the circular surface around the central axis and in a radial direction of the circular surface; and
   a sensor provided opposite to the slit row and comprising:
      a first light receiver configured to output a first light receiving signal as the slit row rotates along the circumferential direction when the disc rotates around the central axis; and
      a second light receiver configured to output a second light receiving signal as the slit row moves along the radial direction when the disc rotates around the central axis.

2. The encoder according to claim 1, wherein the disc has a plurality of slit rows including the slit row, the slit rows being provided on the circular surface along the circumferential direction and positioned from an inner side toward an outer side along the radial direction, each of the slit rows including slits arranged in the circumferential direction with a pitch between the slits, the pitch increasing as the slit rows is positioned from the inner side toward the outer side.

3. The encoder according to claim 1, wherein each of the slits has a shape which is line symmetric in the circumferential direction and in the radial direction.

4. The encoder according to claim 1, wherein each of the slits has a shape having a width in the radial direction which increases and decreases along the circumferential direction.

5. The encoder according to claim 1, wherein each of the slits has a shape which has a width in the circumferential direction which increases and decreases along the radial direction.

6. The encoder according to claim 1, wherein slits are arranged in the circumferential direction with a circumferential pitch between the slits and in the radial direction with a radial pitch between the slits, the circumferential pitch being longer than the radial pitch.

7. The encoder according to claim 1, wherein each of the slits is shaped by compressing in the radial direction a right-angle rotationally symmetric shape.

8. The encoder according to claim 1, wherein each of the slits has a substantially rhomboid shape.

9. The encoder according to claim 1, wherein
   the first light receiver includes first light receiving elements arranged in the circumferential direction and configured to receive light transmitting through or reflected at the slit row and to output the first light receiving signal, and
   the second light receiver includes second light receiving elements arranged in the radial direction and configured to receive light transmitting through or reflected at the slit row and to output the second light receiving signal.

10. The encoder according to claim 1, wherein the first light receiver and the second light receiver are arranged in the circumferential direction.

11. The encoder according to claim 10, wherein
    the first light receiver includes a first light receiving array and a second light receiving array which are arranged separately in the circumferential direction, and
    the second light receiver is positioned between the first light receiving array and the second light receiving array.

12. The encoder according to claim 1, wherein the first light receiver and the second light receiver are arranged symmetrically with respect to a symmetry axis which passes an optical axis of a light source along the radial direction.

13. The encoder according to of claim 1, wherein
    the slit row is provided as a first incremental slit row including the slits arranged to have a first incremental pattern in the circumferential direction, and
    the first light receiver is provided as a first incremental light receiver configured to receive light transmitting through or reflected at the first incremental slit row and to output a first incremental signal.

14. The encoder according to claim 13, wherein
    the disc has a second incremental slit row including a plurality of slits arranged to have a second incremental pattern in the circumferential direction, with a pitch in the circumferential direction shorter than a pitch of the first incremental pattern, and
    the sensor includes a second incremental light receiver configured to receive light transmitting through or reflected at the second incremental slit row and to output a second incremental signal.

15. The encoder according to claim 13, wherein
    the disc has a first absolute slit row including a plurality of slits arranged to have a first absolute pattern in the circumferential direction, and a second absolute slit row including a plurality of slits arranged to have a second absolute pattern in the circumferential direction,
    the sensor includes a first absolute light receiver in which a plurality of first absolute light receiving elements and a plurality of second absolute light receiving elements are alternatively provided in the circumferential direction, the plurality of the first absolute light receiving elements being configured to receive light transmitting through or reflected at the first absolute slit row and to output a first absolute signal having a first phase, and a plurality of second absolute light receiving elements configured to output the first absolute signal having a second phase with predetermined phase difference from the first phase, and a second absolute light receiver in which a plurality of third absolute light receiving elements and a plurality of fourth absolute light receiving elements are alternatively provided in the circumferential direction, the plurality of third absolute light receiving elements being configured to receive light transmitting through or reflected at the second absolute slit row and to output a second absolute signal having the first phase, and a plurality of fourth absolute light receiving elements configured to output the second absolute signal having the second phase.

16. The encoder according to claim 1, further comprising a signal processor configured to execute predetermined signal processing in accordance with at least one of the first light receiving signal and the second light receiving signal, the signal processor comprising:
eccentricity measurement circuitry configured to measure eccentricity as a shift amount in the radial direction during single rotation of the disc in accordance with the second light receiving signal.

17. The encoder according to claim 16, wherein the signal processor includes a first recorder configured to record the eccentricity measured by the eccentricity measurement circuitry, and abnormality determining circuitry configured to compare the eccentricity measured by the eccentricity measurement circuitry and the eccentricity recorded in the first recorder and determine whether or not there is abnormality relevant to the eccentricity.

18. The encoder according to claim 16, wherein the signal processor includes a positional data generating circuitry configured to generate positional data in accordance with the first light receiving signal, a parameter generating circuitry configured to generate a correction parameter for correction of an error of the positional data due to the disc being eccentric, in accordance with the eccentricity measured by the eccentricity measurement circuitry, and a positional data corrector configured to correct the positional data in accordance with the correction parameter.

19. The encoder according to claim 18, wherein the signal processor includes a second recorder configured to record the correction parameter generated by the parameter generating circuitry, and a parameter updater configured to update the correction parameter recorded in the second recorder at predetermined timing.

20. The encoder according to claim 1, wherein the sensor is positioned such that an arrangement direction of a plurality of light receiving elements included in the second light receiver substantially matches a direction connecting a rotation axial center of a shaft in a motor to be measured by the encoder and a rotation axial center of a driving target rotary driven by the motor.

21. A servomotor comprising:
a motor comprising:
a stator; and
a rotor configured to rotate with respect to the stator; and
the encoder according to claim 1, the encoder being configured to detect at least one of a position, speed, and acceleration of the rotor.

22. A servo system comprising:
a motor comprising:
a stator; and
a rotor configured to rotate with respect to the stator;
the encoder according to claim 1, the encoder being configured to detect at least one of a position, speed, or acceleration of the rotor; and
control circuitry configured to control the motor in accordance with a result of detection by the encoder.

* * * * *